(12) United States Patent
Siuta et al.

(10) Patent No.: US 7,246,754 B2
(45) Date of Patent: Jul. 24, 2007

(54) SECURE CURRENCY

(75) Inventors: Ray Siuta, Corvallis, OR (US); Martin Marx, Garden Valley, OR (US); Dan Rengert, Boise, ID (US); Corbin Champion, Pullman, WA (US); Cyrille DeBrebisson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 10/781,197

(22) Filed: Feb. 18, 2004

(65) Prior Publication Data

US 2005/0178822 A1    Aug. 18, 2005

(51) Int. Cl.
- G06K 19/06   (2006.01)
- H04Q 5/22    (2006.01)
- G08B 13/14   (2006.01)
- B42D 15/00   (2006.01)
- B42D 15/10   (2006.01)

(52) U.S. Cl. .................. 238/492; 340/10.1; 340/572.1; 283/72

(58) Field of Classification Search ................ 235/492; 340/572.1, 10.1; 283/72
See application file for complete search history.

(56) References Cited

U.S. PATENT DOCUMENTS

| | | | | |
|---|---|---|---|---|
| 4,855,589 A * | 8/1989 | Enck et al. | ............ | 250/214 VT |
| 5,201,395 A * | 4/1993 | Takizawa et al. | ........... | 194/206 |
| 5,485,143 A * | 1/1996 | Keniston | ................. | 340/568.7 |
| 5,545,885 A * | 8/1996 | Jagielinski | ................... | 235/449 |
| 5,598,793 A * | 2/1997 | Lopez, Jr. | ..................... | 109/25 |
| 5,952,920 A * | 9/1999 | Braddick | ................. | 340/568.1 |
| 5,971,282 A * | 10/1999 | Rollender et al. | .......... | 235/492 |
| 6,070,794 A * | 6/2000 | Niwata et al. | .............. | 235/380 |
| 6,100,804 A * | 8/2000 | Brady et al. | ............. | 340/572.7 |
| 6,109,526 A * | 8/2000 | Ohanian et al. | ........ | 235/462.45 |
| 6,111,506 A * | 8/2000 | Yap et al. | ................. | 340/572.1 |
| 6,177,683 B1 * | 1/2001 | Kolesar et al. | ............. | 250/566 |
| 6,269,169 B1 * | 7/2001 | Funk et al. | .................. | 382/100 |
| 6,463,416 B1 * | 10/2002 | Messina | ........................ | 705/1 |
| 6,513,444 B2 * | 2/2003 | Walker | ........................ | 109/25 |
| 6,547,151 B1 * | 4/2003 | Baldi | .......................... | 235/492 |
| 6,669,100 B1 * | 12/2003 | Rogers et al. | .............. | 235/492 |
| 6,793,134 B2 * | 9/2004 | Clark | .......................... | 235/379 |
| 6,797,974 B2 * | 9/2004 | Philipp et al. | ............. | 250/556 |
| 6,830,192 B1 * | 12/2004 | Krul et al. | ................... | 235/492 |
| 6,843,418 B2 * | 1/2005 | Jones et al. | ............. | 235/462.01 |
| 7,142,115 B2 * | 11/2006 | Waters | ..................... | 340/572.1 |
| 2002/0023955 A1 * | 2/2002 | Frank et al. | ................. | 235/382 |
| 2002/0050515 A1 * | 5/2002 | Ono et al. | ................... | 235/380 |
| 2002/0130777 A1 * | 9/2002 | Besnard | ................... | 340/568.7 |
| 2002/0170955 A1 * | 11/2002 | Hagglund et al. | ........... | 235/379 |
| 2002/0170973 A1 * | 11/2002 | Teraura | ....................... | 235/492 |
| 2003/0006121 A1 * | 1/2003 | Lee et al. | .................... | 194/206 |
| 2003/0222137 A1 * | 12/2003 | Nishimura | .................. | 235/380 |
| 2004/0041707 A1 * | 3/2004 | Hull et al. | ................ | 340/568.1 |
| 2004/0080416 A1 * | 4/2004 | Johnson et al. | .......... | 340/568.7 |
| 2004/0100363 A1 * | 5/2004 | Lane et al. | ................ | 340/5.86 |

(Continued)

Primary Examiner—Daniel Walsh

(57) ABSTRACT

A secure document comprises a pliable fabric comprising human-readable information. The secure document further comprises a memory attached to the pliable fabric in which machine-readable information about the secure document is stored. The secure document further comprises an interface attached to the pliable fabric and coupled to the memory that, when a reader device reads the secure document, transmits at least a portion of the machine-readable information stored in the memory to the reader device.

30 Claims, 14 Drawing Sheets

U.S. PATENT DOCUMENTS

| | | | |
|---|---|---|---|
| 2004/0134994 A1* | 7/2004 | Zaba et al. | 235/492 |
| 2004/0144569 A1* | 7/2004 | Pritchard et al. | 175/99 |
| 2004/0216651 A1* | 11/2004 | Besnard | 109/25 |
| 2004/0233040 A1* | 11/2004 | Lane et al. | 340/5.86 |
| 2005/0007236 A1* | 1/2005 | Lane et al. | 340/5.86 |
| 2005/0010525 A1* | 1/2005 | Ross et al. | 705/43 |
| 2005/0023361 A1* | 2/2005 | Ikefuji et al. | 235/492 |
| 2005/0029353 A1* | 2/2005 | Isemura et al. | 235/454 |
| 2005/0040225 A1* | 2/2005 | Csulits et al. | 235/379 |
| 2005/0067487 A1* | 3/2005 | Brundage et al. | 235/380 |
| 2005/0116816 A1* | 6/2005 | Nitou | 340/426.1 |
| 2005/0121508 A1* | 6/2005 | Fumanelli | 235/379 |
| 2005/0123888 A1* | 6/2005 | Lee | 434/317 |
| 2005/0156033 A1* | 7/2005 | Van Rens | 235/385 |
| 2005/0178822 A1* | 8/2005 | Siuta et al. | 235/379 |
| 2005/0237576 A1* | 10/2005 | Schneider | 358/3.28 |
| 2006/0176181 A1* | 8/2006 | Halope | 340/572.8 |
| 2006/0202010 A1* | 9/2006 | McDonnell | 235/375 |
| 2006/0202027 A1* | 9/2006 | Demere | 235/381 |
| 2006/0208089 A1* | 9/2006 | Sadler et al. | 235/487 |
| 2007/0080533 A1* | 4/2007 | Bleikholm et al. | 283/72 |
| 2007/0090954 A1* | 4/2007 | Mahaffey | 340/572.3 |
| 2007/0095928 A1* | 5/2007 | Balinsky et al. | 235/492 |
| 2007/0096910 A1* | 5/2007 | Waters | 340/572.1 |

* cited by examiner

SECURE CURRENCY

TECHNICAL FIELD

The following description relates to secure documents in general and to secure currency in particular.

BACKGROUND

The increasing availability of low-cost, full-color imaging devices such as laser and inkjet printers and off-the-shelf imaging software has lead to an increase in counterfeiting of paper-based currency. The treasury departments of governments across the world in conjunction with imaging product manufacturers have taken steps to reduce counterfeiting.

One approach is to identify the imaging devices used to make counterfeit currency. For example, color copiers and printers typically print an invisible watermark that includes a serial number associated with that particular copier or printer. When a copy or print is made with such a copier or printer, the invisible watermark can be decoded in order to read the serial number. Such an approach, however, typically only helps in identifying the imaging device used to make that copy or print.

SUMMARY

In one embodiment, a secure document comprises a pliable fabric comprising human-readable information. The secure document further comprises a memory attached to the pliable fabric in which machine-readable information about the secure document is stored. The secure document further comprises an interface attached to the pliable fabric and coupled to the memory that, when a reader device reads the secure document, transmits at least a portion of the machine-readable information stored in the memory to the reader device.

In another embodiment, a currency comprises a pliable fabric comprising human-readable currency information. The secure currency further comprises a security module comprising a memory attached to the pliable fabric in which machine-readable currency information is stored and a radio frequency interface attached to the pliable fabric and coupled to the memory. The radio frequency interface transmits at least a portion of the machine-readable currency information to a radio frequency reader device when the radio frequency interface receives a radio frequency field radiated by the radio frequency reader device.

In another embodiment, a currency comprises a fabric and a security module attached to the fabric. The security module comprises a memory in which information about the currency is stored and an ink reservoir in which ink is stored. When the security module receives a predetermined command, the security module releases the ink stored in the ink reservoir in order to mark the fabric.

Another embodiment is a secure server for tracking a plurality of secure documents, each of the plurality of secure documents comprising human-readable information and a memory in which a machine-readable identifier is stored. The secure server comprises a database and an interface in communication with the database that, when coupled to a network, communicates over the network with at least one client device. When first information related to a first one of the plurality of secure documents is received by the secure server from the client device, the secure server stores at least a portion of the first information in the database. The first information comprises the machine-readable identifier read by the client device from the first one of the plurality of secure documents.

Another embodiment is a device for reading a secure document that comprises human-readable information and a memory in which a machine-readable identifier is stored. The device comprises a reader device that, when the device reads the secure document, reads the machine-readable identifier stored in the memory of the secure document. The device further comprises an interface that, when coupled to a network, communicates with a secure server coupled to the network. The device sends first information related to the secure document to the secure server over the network via the interface. The first information includes the machine-readable identifier.

Another embodiment is a method of tracking secure currency that comprises a pliable fabric and a security module in which machine-readable currency information is stored. The method comprises, in connection with a physical transfer of the secure currency, reading machine-readable currency information from the security module using a reader device, obtaining information related to the physical transfer of the secure currency, and sending at least a portion of the machine-readable currency information and the obtained information to a database for storage in the database.

Another embodiment is a method of manufacturing secure currency that comprises a pliable fabric. The method comprises attaching a security module to the pliable fabric of the secure currency. The method further includes, after attaching the security module to the pliable fabric of the secure currency, putting the secure currency into an inactive state and, when the secure currency is ready to be put into circulation, activating the item of secure currency.

Another embodiment is a method of destroying a secure document that comprises a pliable fabric and a security module attached to the pliable fabric. The method comprises, when the secure document is to be destroyed, deactivating the secure document, physically collecting the secure document, and destroying the secure document. Destroying the secure document comprises separating the security module from the pliable fabric of the secure document.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
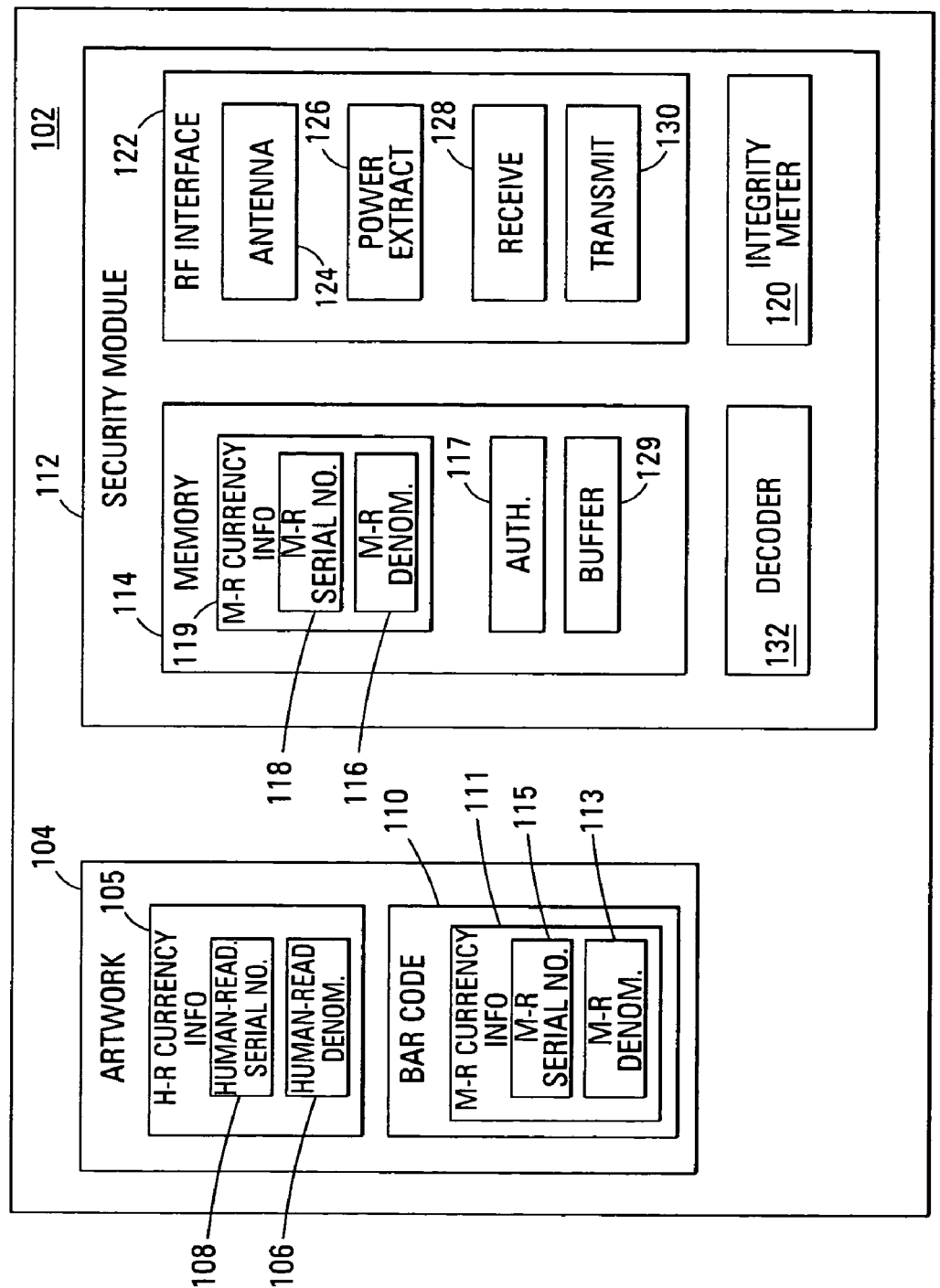
FIG. 1 is a block diagram of one embodiment of a secure document.

FIG. 1 is a block diagram of one embodiment of a secure document 100. In the embodiment shown in FIG. 1, secure document 100 is implemented as an item of currency (referred to here as "secure currency" 100). It is to be understood, however, embodiments of secure document 100 are suitable for use in other applications, for example, where it is desired to have a document (such as a traveler's check, coupon, gift certificate, passport, driver's license, or other personal identification document) documents with security or tracking functionality.

Secure currency 100 includes a pliable fabric 102. In one embodiment, the fabric 102 comprises natural and/or synthetic fibers that are weaved (or otherwise formed) into a fabric. In other embodiments, the pliable fabric 102 comprises cloth, paper, and/or laminate formed from or otherwise comprising natural and/or synthetic materials. Pliable fabric 102 is "pliable" in that fabric 102 allows the secure currency 100 to be handled in the same general manner as conventional paper currency including, for example, by allowing the secure currency 100 to be folded or curled without breaking. Various currency-related images and/or other indicia (collectively referred to here as "artwork" 104) are printed on the pliable fabric 102. For example, in one embodiment, the artwork 104 includes human-readable currency information 105. In the embodiment shown in FIG. 1, the human-readable currency information 105 includes a human-readable representation of a denomination 106 of the item of secure currency 100 (for example, indicating that the item of secure currency 100 is a 20 dollar bill). Also, in such an embodiment, the human-readable currency information 105 includes a human-readable representation of a serial number 108 (or other identification information) for the item of secure currency 100.

In the embodiment shown in FIG. 1, the artwork 104 also includes a machine-readable representation of one or more of the human-readable items. The artwork 104 includes a bar code 110. The bar code 110, in one implementation of such an embodiment, is embedded in the artwork 104 using watermarking techniques so that the bar code 110 is not readable by a human observing the artwork 104. The watermarked bar code 110 in such an implementation, however, is readable by an optical bar code reader when the artwork 104 (which includes the watermarked bar code 110) is scanned by the optical bar code reader. In another implementation of such embodiment, the bar code 110 is embedded in the artwork 104 by printing the bar code 110 using a magnetic ink that is not perceptible to the unaided human eye. The magnetic bar code 110 in such an implementation, however, is readable by a magnetic bar code reader when the artwork 104 (which includes the magnetic bar code 110) is scanned by the magnetic bar code reader. In another implementation, the bar code 110 is embedded in the artwork 104 using watermarking techniques and using magnetic ink.

In the embodiment shown in FIG. 1, the bar code 110 includes machine-readable currency information 111 encoded therein. For example, as shown in FIG. 1, the machine-readable currency information 111 comprises a machine-readable denomination 113 (for example, 20 dollars) and a machine-readable identifier 115 (for example, a machine-readable serial number 115 in the embodiment shown in FIG. 1).

The secure currency 100 also includes security module 112. In the embodiment shown in FIG. 1, the security module 112 is implemented using a passive radio frequency identification (RFID) transponder. In one implementation of the embodiment shown in FIG. 1, the security module 112 is fabricated as a single, monolithic component, for example, as a single integrated circuit (also referred to here as a "single chip") that includes the functionality described here as being included in the security module 112. The security module 112 includes a memory 114. In the embodiment shown in FIG. 1, at least a portion of memory 114 is non-volatile. In one embodiment, memory 114 includes a relatively small (for example, on the order of 1 kilobyte) and low-power read only memory (ROM) or write-once memory (WOM). In such an embodiment, machine-readable currency information 119 is stored in the memory 114 when the currency 100 is manufactured or when the currency 100 is activated and put into circulation (for example, as described below in connection with FIG. 7). In one example, the machine-readable currency information 119 comprises a machine-readable denomination 116 (for example, 20 dollars) and a machine-readable identifier 118 (for example, a machine-readable serial number 118 in the embodiment shown in FIG. 1). In other embodiments, other information or data is stored in memory 114 in addition to or instead of the denomination 116 and serial number 118. For example, in one embodiment, such other information or data includes an indication of whether a particular item of secure currency 100 has been activated or deactivated and/or an indication of whether the particular item of secure currency 100 has been tampered with. Other examples of such other information or data include data generated by one or more sensors included in the secure currency 100 and/or data related to one or more transactions in which the particular item of secure currency 100 has been used.

The security module 112 also includes an integrity meter 120. The integrity meter 120 includes a sensor or other mechanism that is used to determine whether the integrity of the security module 112 or the pliable fabric 102 has been compromised due to, for example, tampering or wear. In one embodiment, the integrity meter 120 determines whether the security module 112 is securely attached to the pliable fabric 102. One such embodiment of an integrity meter 120 is described below in connection with FIG. 10.

The security module 112 includes a radio frequency (RF) interface 122. The RF interface 122 includes an antenna 124 on which RF signals are received and transmitted. A RF reader device (not shown in FIG. 1) communicates with the security module 112 using a RF signal in order to "read" data stored in the memory 114 of the security module 112. Also, in the embodiment shown in FIG. 1, such a RF reader device communicates with the security module 112 using a RF signal in order to "write" data to the memory 114. In another embodiment, however, the security module 112 can only be read via the RF interface 122 and not written to. In such a read-only embodiment, functionality described here for carrying out such write operations via the RF interface 122 need not be included in the security module 112. In such a read-only embodiment, data is written to memory 114 some other way (for example, by including a programmable read only memory (PROM) in memory 114 that is programmed, for example, using a laser).

When a RF signal radiated by a RF reader device is received on the antenna 124, a power extraction circuit 126 included in the RF interface 122 outputs a power signal generated from the received RF signal. When the received RF signal contains sufficient power, the power signal output by the power extraction circuit 126 turns on the components of the security module 112 (also referred to here as "powering on" or "waking up" the security module 112). In one embodiment, the power extraction circuit 126 includes a rectifier that rectifies the received RF signal in order to output a direct current (DC) power signal used to power the security module 112. In one implementation of such an embodiment, the power extraction circuit 126 includes a capacitor (or other power storage element) that is charged by the DC power signal output by such a rectifier. In another implementation, no such power storage element is used.

The RF interface 122 also includes a receive circuit 128. The receive circuit 128 extracts any data included in the received RF signal (referred to here as "received data"). In some embodiments, the receive circuit 128 includes a demodulator that demodulates the received RF signal to extract data modulated thereon. A buffer 129 stores a digital representation of the extracted data output by the demodulator.

The RF interface 122 also includes a transmit circuit 130. The transmit circuit 130 is used to transmit data over the antenna 124. In one embodiment, the transmit circuit 130 includes a modulator that modulates the received RF signal with the transmitted data. In one implementation of such an embodiment, the transmit circuit 130 damps the received RF signal with an internal load across the antenna 124 in order to modulate the received RF signal with the transmit data. In some embodiments, the transmit data includes at least a portion of the information stored in memory 114. For example, in one such embodiment, the denomination 116 and serial number 118 stored in the memory 114 are transmitted. Also, in one embodiment, the status of the integrity meter 120 (or other sensors included in the security module 112) is transmitted. Although the antenna 124, the power extraction circuit 126, the receive circuit 128, and the transmit circuit 130 are shown separately in FIG. 1, in some embodiments one or more of these items are combined in whole or in part.

The security module 112 also includes a decoder 132. In the embodiment shown in FIG. 1, the decoder 132 determines what operation, if any, the security module 112 should perform when the security module 112 is woken up. In one embodiment, an authentication process or operation is performed before any read or write operations are performed by the security module 1112. In one implementation of such an embodiment, the decoder 132 authenticates the RF reader device that radiated the RF field that woke up the security module 112. In another implementation of such an embodiment, the RF reader device authenticates the security module 112. In another implementation, both the security module 112 authenticates the RF reader device and the RF reader device authenticates the security module 112. Where such an authentication process or operation is performed, a subsequent read or write operation is performed only if the authentication process or operation is successful. In one implementation of such an embodiment, authentication data 117 is also stored in memory 114 (for example, during manufacture or activation of the item of secure currency 100). The authentication data 117, for example, includes data indicating which RF reader devices are authorized to communicate with the RF reader device and/or data that is provided to the RF reader device so that the RF reader device can determine if the security module 112 is authorized to communicate with that RF reader device.

When the decoder 132 determines that a write operation is to be performed, at least a portion of the received data is written to memory 114. In one embodiment where such received data is written to write once memory included in memory 114, such a write operation is performed only once. Also, in one embodiment where communications between the security module 112 and the reader device are encrypted, the decoder 132 decrypts the received data prior to storage in the memory 114. In another embodiment where communications between the security module 112 and the reader device are encrypted, the decoder 132 stores the received data in memory 114 in encrypted form.

When the decoder 132 determines that a read operation is to be performed, at least a portion of the data stored in memory 114 is read and transmitted to the reader device via the transmit circuit 130. Also, in the embodiment shown in FIG. 1, when a read operation is to be performed, the state of the integrity meter 120 is read when a read operation is performed. The state of the integrity meter 120 is included in the data that is transmitted to the RF reader device. In one embodiment where communications between the security module 112 and the RF reader device are encrypted, the decoder 132 encrypts the data read from the memory 114 and the integrity meter 120 prior to transmission. In another embodiment where communications between the security module 112 and the reader device are encrypted and where data stored in the memory 114 is stored in encrypted form, the decoder 132 does not need to encrypt the data read from the memory 114 since the data is already in encrypted form.

In one embodiment, the decoder 132 is implemented as a finite state machine that is implemented, for example, as a non-clocked, in-line encoding logic circuit. Using such a non-clocked circuit obviates the need to generate a clock signal. In other embodiments, implemented using circuitry and/or devices that require a clock signal, the RF interface 122 includes a clock recovery circuit that generates a clock signal based on the received RF signal.

Figure 2A:
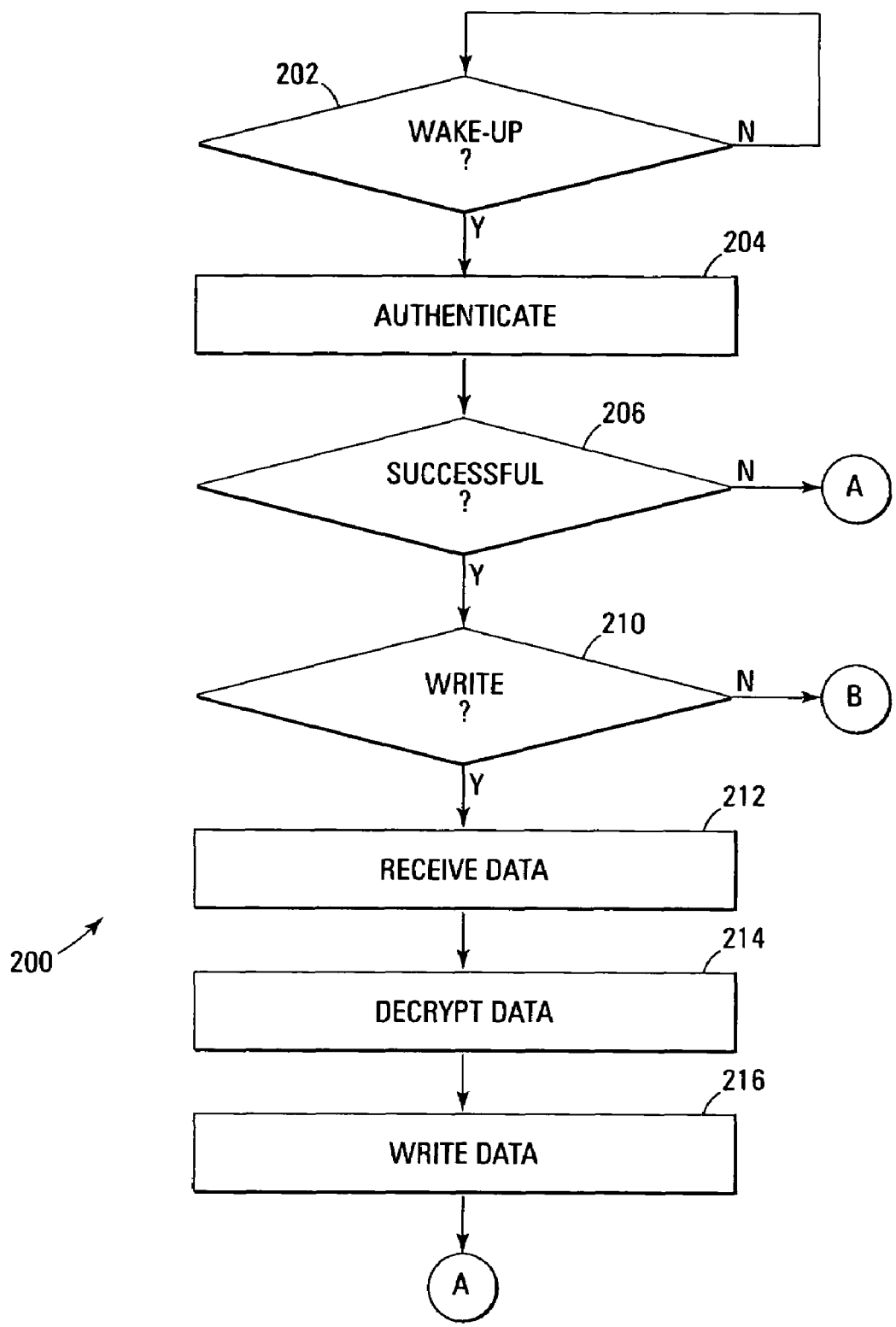
FIGS. 2A-2B show a flow diagram of one embodiment of a method of writing data to and reading data from a security module included on a secure document.
Figure 2B:
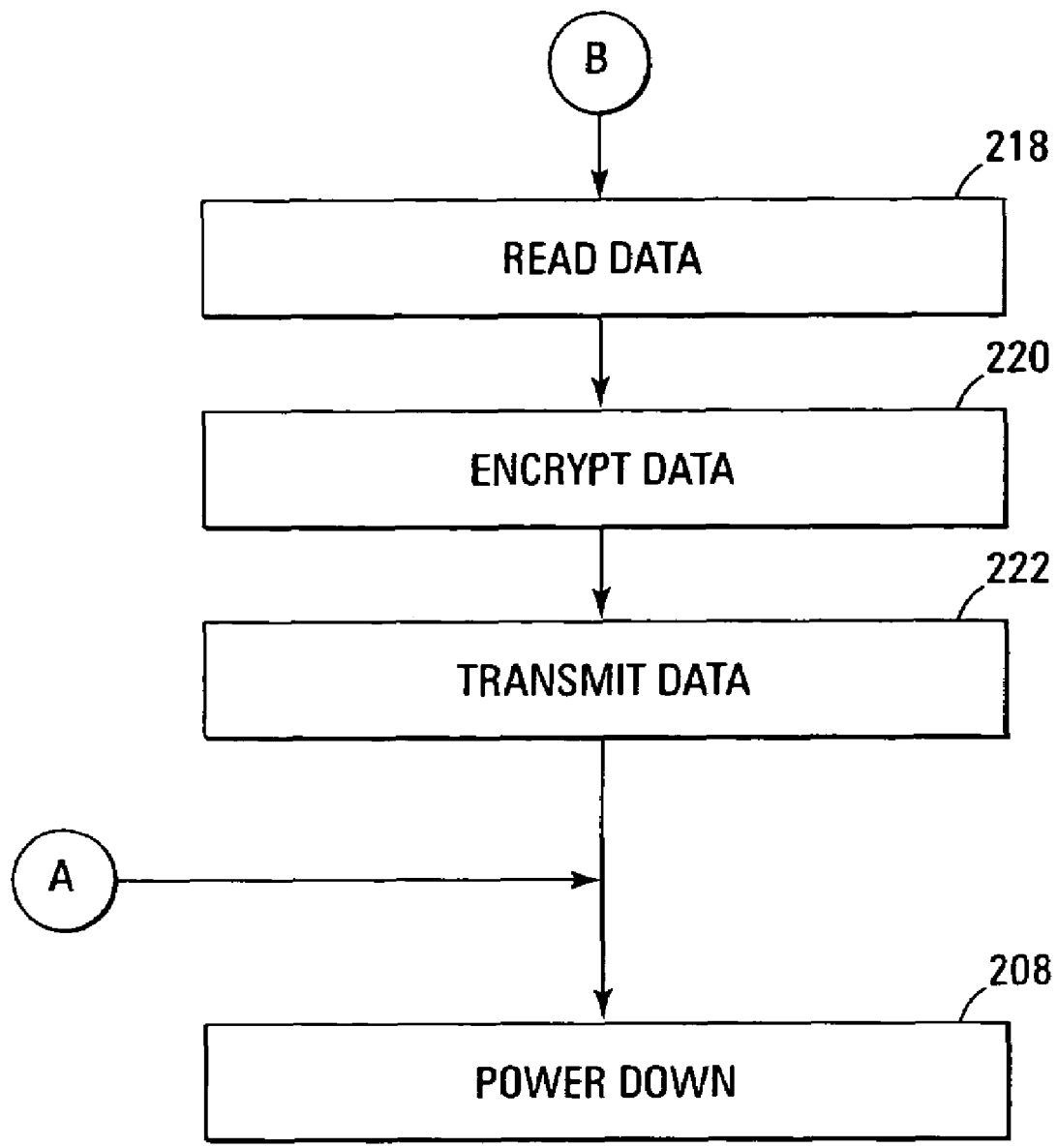

FIGS. 2A-2B show a flow diagram of one embodiment of a method 200 of writing data to and reading data from a security module included on a secure document. In the embodiment shown in FIGS. 2A-2B, method 200 is implemented using the embodiment of secure currency 100 shown in FIG. 1. In such an embodiment, the functionality of method 200 is performed by the decoder 132 of the security module 112 while the security module 112 communicates with a RF reader device 316 (described below in connection with FIG. 3). It is to be understood, however, that other embodiments of method 200 are implemented using other embodiments of secure currency, other types of secure documents, and/or other reader devices. Method 200 starts when the security module 112 is woken up (checked in block 202 shown in FIG. 2A). The security module 112 is woken up when the RF signal received by the antenna 124 contains sufficient power to power on the security module 112. In one example, this occurs when the item of secure currency 100 is placed in a RF field radiated by a RF reader device. When such a RF signal is received by the antenna 124, the power extraction circuit 126 outputs a power signal. If the power signal contains sufficient power to wake up the security module 112, the security module 112 wakes up.

In the embodiment shown in FIGS. 2A-2B, when the security module 112 of the secure currency 100 wakes up, an authentication process is performed (block 204). For example, in one implementation of such an embodiment, the decoder 132 authenticates the RF reader device with which the security module 112 communicates. The decoder 132 authenticates the RF reader device, for example, to determine if that RF reader device is authorized to communicate with that security module 112. In one such implementation, the decoder 132 authenticates the RF reader device using an identifier (or other data) included in data received by the security module 112 from the RF reader device. The identifier is compared to the authentication data 117 stored in memory 114. In another implementation of such an embodiment, the RF reader device authenticates the security module 112. That is, the RF reader device with which the security module 112 communicates determines if that security module 112 is authorized to communicate with that RF read device. In one such implementation, the RF reader device authenticates the security module 112, for example, by having the decoder 132 cause the security module 112 to transmit the serial number of the secure currency 100 (or other data such as authentication data 117) to the RF reader device. The RF reader device receives the serial number (or other data) and compares the serial number to a list (or other data structure) containing authorized items of secure currency 100. In another implementation of such an embodiment, the decoder 132 authenticates the RF reader device and the RF reader device authenticates the security module 112. In another embodiment, no authentication process is performed.

In the embodiment shown in FIGS. 2A-2B, if the authentication process is unsuccessful (checked in block 206), the security module 112 powers down (block 208 shown in FIG. 2B) and method 200 is restarted. If the authentication process is successful, the decoder 132 determines if a write operation is to be performed (block 210 shown in FIG. 2A). In one implementation of such an embodiment, when a write operation is to be performed, the RF signal output by the RF reader device includes an amount of power that is above a predetermined write power threshold. Such an approach is suitable for embodiments of the secure currency 100 where the amount of power required by the security module 112 to write data to the memory 114 is higher than that required to read data from the memory 114. In such an implementation, the power extraction circuitry 126 includes power level detection circuitry that detects whether or not the amount of power supplied in the received RF signal is greater than the predetermined write power threshold. In another implementation of such an embodiment, the determination as to whether a write operation is to be performed is made by the decoder 132 by inspecting data received on the antenna 124 from the RF reader device. If the received data includes a predetermined command or other data (also referred to here as a "write command"), a write operation is to be performed. In other embodiments, the determination as to whether a write operation is to be performed is made in other ways.

If a write operation is to be performed, the decoder 132 receives data via the antenna 124 (block 212). In the embodiment shown in FIGS. 2A-2B, the data transmitted by the reader device 316 (shown in FIG. 3) and received via antenna 124 is in encrypted form and is decrypted by decoder 132 before writing to memory 114 (block 214). After the received data is decrypted, the decoder 132 writes at least a portion of the decrypted data to memory 114 (block 216). In the embodiment shown in FIGS. 2A-2B, when a RF signal is received via the antenna 124, the receive circuit 128 demodulates and extracts any data encoded in the received RF signal and stores a digital representation of the extracted data in buffer 129. The decoder 132 decrypts the received data and writes at least a portion of the decrypted data to memory 114. In other embodiments, the received data is not decrypted prior to being written to memory 114, for example, because the data stored in memory 114 is stored in encrypted form or because the data transmitted by the RF reader device is not in encrypted form.

In one implementation of the embodiment shown in FIGS. 2A-2B, all the data stored in the memory 114 is overwritten when a write operation is performed. In such an implementation, the decoder 132 writes the first unit of data that is written to a predetermined starting address in memory 114 and writes each successive unit of data at successive addresses in memory 114 (for example, by incrementing a counter). Such an approach to writing data is suitable for use in initializing all the data stored in the memory 114 at one time, for example, during manufacture of the secure currency 100 or during activation of the secure currency 100. For example, where memory 114 includes write-once-memory, such a write operation is performed only once to write all data stored in memory 114.

After the write operation is complete, the security module 112 powers down (block 208 shown in FIG. 2B) and method 200 is restarted.

If a read operation is to be performed, the decoder 132 reads from memory 114 at least a portion of the data stored in memory 114 (block 218 shown in FIG. 2B). In the embodiment shown in FIGS. 2A-2B, the data read from memory 114 is encrypted (block 220) and then transmitted to the RF reader device (block 222). In the embodiment shown in FIGS. 2A-2B, the decoder 132 reads data from memory 114 and encrypts the read data. The transmit circuit 130 encodes and modulates the encrypted data to produce a RF signal that is transmitted over antenna 124. Then, the security module 112 powers down (block 208) and method 200 restarts.

In one implementation of the embodiment shown in FIGS. 2A-2B, all the data stored in the memory 114 is read from memory 114 and transmitted over antenna 124 when a read operation is performed. In such an implementation, the decoder 132 reads the first unit of data that is read during the read operation from a predetermined starting address in memory 114 and reads each successive unit of data at successive addresses in memory 114 (for example, by incrementing a counter) until all data is read.

Figure 3:
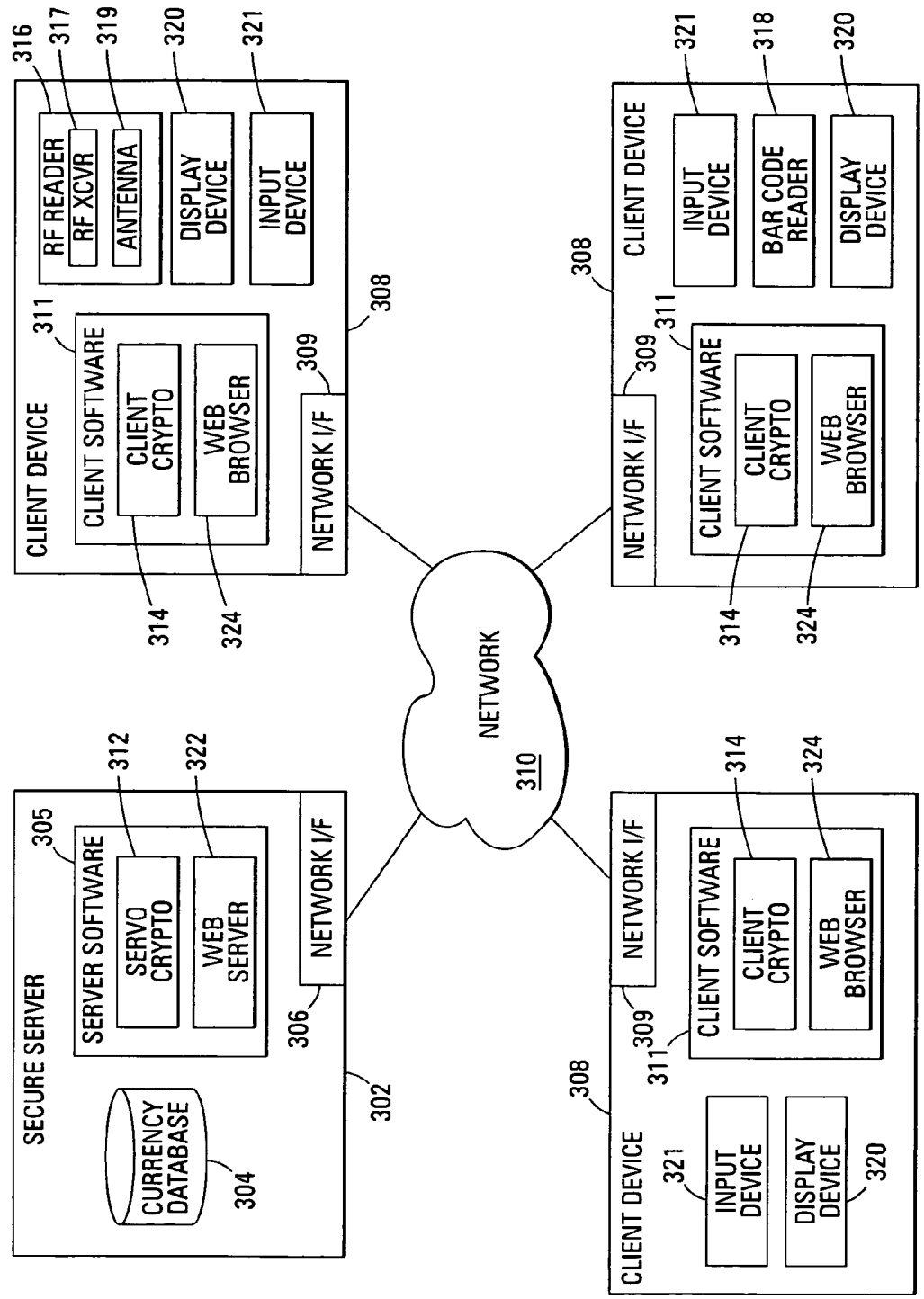
FIG. 3 is a block diagram of one embodiment of a secure document system.

FIG. 3 is a block diagram of one embodiment of a secure document system 300. In the embodiment shown in FIG. 3, secure document system 300 is implemented using the embodiment of secure currency 100 shown in FIG. 1. Secure document system 300 is also referred to here as a "secure currency" system 300. It is to be understood, however, that other embodiments of secure document system 300 are implemented using other embodiments of secure currency and other types of secure documents. System 300 includes a secure server 302. Secure server 302 includes a currency database 304. Server software 305 executing on the secure server 302 stores information about items of secure currency 100 in the currency database 304. The server software 305 is executed on one or more programmable processors 307 included in the secure server 302.

For example, in one embodiment, for each item of secure currency 100 tracked by the secure server 302, the information stored in the currency database 304 for that item of secure currency 100 includes the serial number (or other identifier) and denomination for that item of secure currency 100. In such an embodiment, the information stored in the currency database 304 for each item of secure currency 100 also includes an indication of whether that item of secure currency 100 has been activated or deactivated.

In one embodiment, the information stored in the secure currency database 304 includes where each item of secure currency 100 was printed, where each item of secure currency 100 was activated, and information about one or more transactions in which each item of secure currency 100 was used. As used herein, a transaction occurs when one or more items of secure currency 100 are physically transferred from one party to another party (for example, where one or more items of secure currency 100 are tendered for payment for goods and/or services). For example, in one implementation of such an embodiment, the transaction information stored in the currency database 304 for an item of secure currency 100 includes where and when a transaction involving that item of secure currency 100 took place, who was involved in the transaction, how much money was involved in that transaction, and the serial numbers of other items of secure currency 100 involved in the transaction. In other embodiments, other information is stored in the currency database 304 for each item of secure currency 100 that is tracked by the secure server 302. For example, in embodiments where the secure currency 100 includes a sensor (for example, an integrity meter 120), data generated by the sensors is stored in the currency database 304 for each item of secure currency 100.

The secure server 302 includes a network interface 306 that is used to couple the secure server 302 to a network 310. One or more client devices 308 communicate with the secure server 302 using the network 310. Each client device 308 includes a network interface 309 that is used to couple the client device 308 to the network 310 so that the client device 308 can communicate over the network 310. Each client device 308 executes client software 311 that carries out the functionality described here as being performed by each client device 308. The client software 311 is executed on one or more programmable processors 313 included in each client device 308. One example of a client device 308 is a computer workstation.

In the embodiment shown in FIG. 3, the network 310 includes a public network such as the Internet. In such an embodiment, the server software 305 includes a server cryptography module 312 and the client software 311 executed on each of the client devices 308 includes a client cryptography module 314. The cryptography modules 312 and 314 are used to encrypt, decrypt, and authenticate communications between the client devices 308 and the secure server 302. In one implementation of such an embodiment, the cryptography modules 312 and 314 are implemented using public key cryptography technology (for example secure sockets layer (SSL) technology).

In the embodiment shown in FIG. 3, at least one client device 308 has a RF reader device 316 coupled to that client device 308 (for example, over a serial communication link). The RF reader device 316 includes a RF transceiver 317 and an antenna 319. The operation of the RF reader device 316 is controlled by the client software 311 executing on the client device 308. When the RF reader device 316 is used to read one or more items of secure currency 100, the RF transceiver 317 radiates an RF signal via antenna 319, thereby creating an RF field. When an item of secure currency 100 is placed within the radiated RF field, the antenna 124 of the item of secure currency 100 receives the RF signal radiated by the antenna 319. As described above, the power extraction circuit 126 outputs a power signal based on the received RF signal. If the power signal contains sufficient power, the security module 112 powers on and communicates with the RF reader device 316. In one embodiment, the RF reader device 316 detects the presence of the powered-on security module 112. Once the security module 112 has woken up and the RF reader device 316 has detected the presence of the item of secure currency 100 (more specifically, the security module 112), the RF reader device 316 reads information from or writes information to the security module 112, for example, as described above in connection with the embodiment of method 200 shown in FIGS. 2A-2B.

In one example, the RF reader device 316 reads the denomination 116 and serial number 118 stored in memory 114 of the security module 112 and the status of the integrity meter 120 of the security module 112. The client device 308 to which the RF reader device 316 is coupled then uses the data read from the security module 112 for subsequent processing. In another example, the RF reader device 316 is used to write the denomination 116 and serial number 118 to memory 114 of the security module 112 (for example, during manufacture or activation of the item of secure currency 100). In such an example, the RF reader device 316 is sometimes referred to as a "RF writer device" or a "RF reader/write device" (where the device is capable of both reading from and writing to the security module 112). In embodiments of the secure currency 100 where memory 114 is implemented using write-once memory, such a write operation is performed once (for example, during manufacture or activation of the item of secure currency 100).

In the embodiment shown in FIG. 3, at least one client device 308 has a bar code reader device 318 coupled to that client device 308. In embodiments where the bar code 110 included in the artwork 104 of an item of secure currency 100 is a watermarked bar code, the bar code reader device 318 includes an optical bar code reader suitable for reading the watermarked bar code printed on the item of secure currency 100. In embodiments where the bar code 110 included in the artwork 104 is a magnetic bar code, the bar code reader device 318 includes a magnetic bar code reader suitable for reading the magnetic bar code printed on the item of secure currency 100. In other embodiments, the bar code reader device 318 includes both optical bar code reader and magnetic bar code reader functionality that allows the bar code reader device 318 to read both watermarked and magnetic bar codes printed on items of secure currency 100.

In the embodiment shown in FIG. 3, at least some of the client devices 308 include or are attached to a display device 320 on which the client device 308 displays information read from the item of secure currency 100 and/or received from the secure sever 302. In one implementation, the display device 320 includes a computer monitor. For example, information read from an item of secure currency 100 such as the denomination 116 is displayed on a display device 320, for example, so that a user of the client device 308 can check if the human-readable denomination 106 matches the denomination 116 stored in memory 114 of the item of secure currency 100. In addition (or instead), information returned from the secure server 302 such as an indication of whether the item of secure currency 100 has been activated or reported stolen is displayed on a display device 320. In another implementation, the display device 320 includes one or more light emitting diodes or other indicators that are used to indicate the status of some aspect of the operation of the client device 308, RF reader device 316, and/or bar code reader device 318 attached to that client device 308. For example in one implementation, one indicator indicates that the client device 308 is ready to read an item of secure currency 100 and then, after reading the item of secure currency 100, indicates that the read operation was successful or unsuccessful.

In the embodiment of a secure document system 300 shown in FIG. 3, server software 305 includes a web server 322. The web server 322 allows a user of a client device 308 to interact with the secure sever 302 using a web browser 324 executing on the client device 308. A user interface for the web browser 324 is displayed on a display device 320 connected to the client device 308. Information is received from the user via an input device 321 coupled to the client device 308 (such as a keyboard). Information is displayed for the reader via the user interface of the web browser 324. Thus, a user need not have a RF reader device 316 or a bar code reader device 318 to query the secure server 302 (for example, to determine if an item of secure currency 100 has been activated) or to supply information about an item of secure currency 100 or a transaction in which the item was used.

For example, in such an embodiment, when one or more items of secure currency 100 are tendered in order to pay for goods or services, a user directs the web browser 324 to access a web site provided by the web server 322. A web page is supplied by the web server 322 to the web browser 324 for display by the client device 308 on a display device 320 attached to the client device 308. The web page includes one or more fields (or other user interface elements) in which the user is able to enter information about the item of secure currency 100 and/or the transaction in which the item is used.

In one scenario, the user reads the human-readable serial number 108 and human-readable denomination 106 included in the artwork 104 printed on each item of secure currency 100 and enters that information into an appropriate field on the web page displayed by the web browser 324. As a result, the web browser 324 will have the denomination and serial number of each item of secure currency 100 used in the transaction. The web browser 324 communicates the entered information about each item of secure currency 100 to the web server 322. In such an embodiment, the web server 322 provides information to the client device 308 for display by the web browser 324 on the display device 320. More specifically, the web server 322 generates and sends to the web browser 324 an appropriate web page for display on the display device 320 coupled to the client device 308. In the embodiment shown in FIGS. 2A-2B, the server cryptography module 312 of the secure server 302 and the client cryptography module 314 of that client device 308 secure the communications between the web browser 324 and the web server 322 (for example, using SSL technology).

Figure 4:
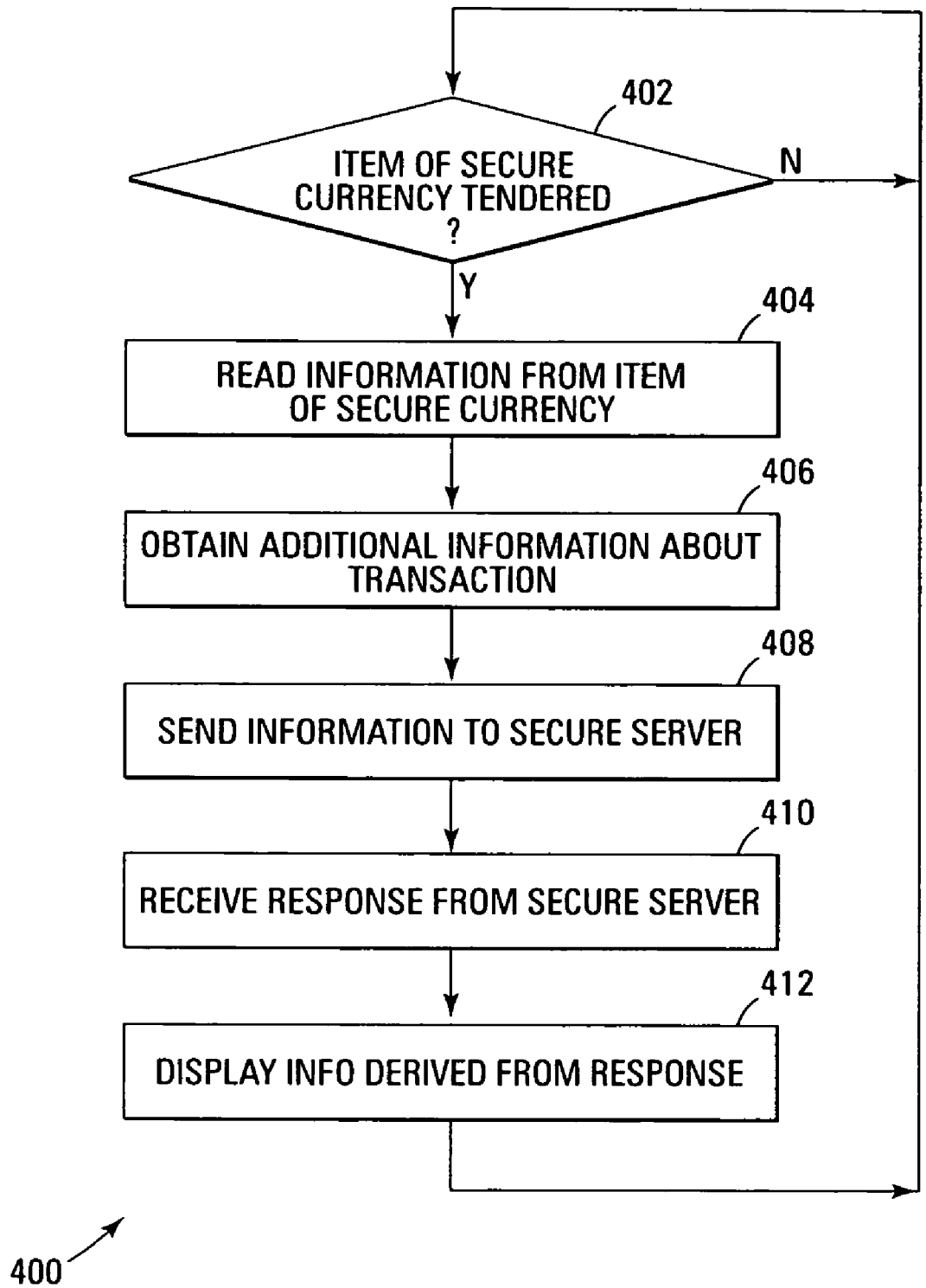
FIG. 4 is a flow diagram of one embodiment of a method of tracking an item of secure currency.

FIG. 4 is a flow diagram of one embodiment of a method 400 of tracking an item of secure currency 100. In the embodiment shown in FIG. 4, the functionality of method 400 is implemented and carried out by a client device 308 of the secure system 300 shown in FIG. 3. For example, in one exemplary implementation, the functionality of method 400 is implemented in software that is executed by client device 308. Moreover, the embodiment of method 400 is used to track items of secure currency 100 of the type shown in FIG. 1. The embodiment of method 400 is suitable for use, for example, at locations where items of secure currency 100 are received (for example, at a retail point of sale or a bank teller where a client device 308 is located). Other embodiments of method 400, however, are implemented using other devices, systems, and secure documents.

When one or more items of secure currency 100 are tendered in connection with a transaction (checked in block 402), information related to the transaction is read from at least one of the items of secure currency 100 (block 404). Information such as denomination and serial number is read from each item of secure currency 100. Each item of secure currency 100 can be read in a number of ways. A user of the client device 308 can read the human-readable serial number 108 and the human-readable denomination 106 printed on each item of secure currency 100 and then enter the human-readable information into, for example, a web browser 324 executing on the client device 308. Where a RF reader 316 is coupled to the client device 308, the RF reader 316 can be used to read the information (for example, serial number 118 and denomination 116) stored in memory 114 of each item of secure currency 100. Where a bar code reader 318 is coupled to the client device 308, the bar code reader 318 can be used to read the information encoded in the bar code 110 included in the artwork 104 printed on each item of secure currency 100.

In the embodiment of method 400 shown in FIG. 4, the client device 308 receives (or otherwise obtains) additional information about the transaction (block 406). In one embodiment, such additional transaction information includes information about the receiving client device 308. For example, the client device information in one embodiment includes a serial number or other identifier of the client device 308 and a location of the client device 308. Such client device information, in one embodiment, is predetermined (that is, the client device 308 is preset with the serial number and/or information about the location of the client device 308) and information typically does not change from transaction to transaction.

In one embodiment, such additional transaction information includes information about one or more of the parties to the transaction (for example, a social security number or other identifier), the subject matter of the transaction (for example, the particular goods or services purchased), any taxes or other governmental fees that were paid as a part of transaction, and/or the time of the transaction. Such additional transaction information is provided to the client device 308, for example, by having a user of the client device 308 enter such information into a web browser 324 (or other software) executing on the client device 308, or by receiving the information from, for example, an optical scanner coupled to the client device 308. The scanner is used to scan a universal price code (UPC) bar code affixed to each of one or more goods purchased as a part of the transaction.

The information read from the items of secure currency 100 and the additional transaction information are sent from the client device 308 to the secure server 302 over network 310 (block 408). In one embodiment, the server cryptography module 312 and the client cryptography module 314 are used to encrypt, decrypt, and authenticate communications between the client devices 308 and the secure server 302 (for example, using public key encryption technology).

The secure server 302 receives the transferred information and processes the transferred information, for example, as described below in connection with FIG. 5. In the embodiment shown in FIG. 4, the client device 308 receives a response from the secure sever 302 about the item of secure currency (block 410) and displays information on the display device 320 based on the received response (block 412). For example, in one implementation of such an embodiment, the response received from the secure server 302 includes an indication if there is any reason why any particular item of secure currency 100 included in the transaction should not be accepted or used in that particular transaction and/or that a particular governmental agency (for example, the police) should be notified in connection with the use of an item of secure currency 100 in this transaction. For example, it may be the case that the secure currency database 304 at the secure server 302 indicates that a particular item of secure currency 100 used in the transaction has been stolen. In such a case, the response sent from the server 302 by the client device 308 includes information indicating that the item of secure currency 100 has been stolen and should not be accepted and that the police (or the party that reported the particular of item of secure currency 100 as stolen) should be contacted in connection with this transaction. Client software 311 (such as web browser 324) executing on the client device 308 displays such information on a display device 320 coupled to the client device 308 for a user of the client device 308 to view.

Figure 5:
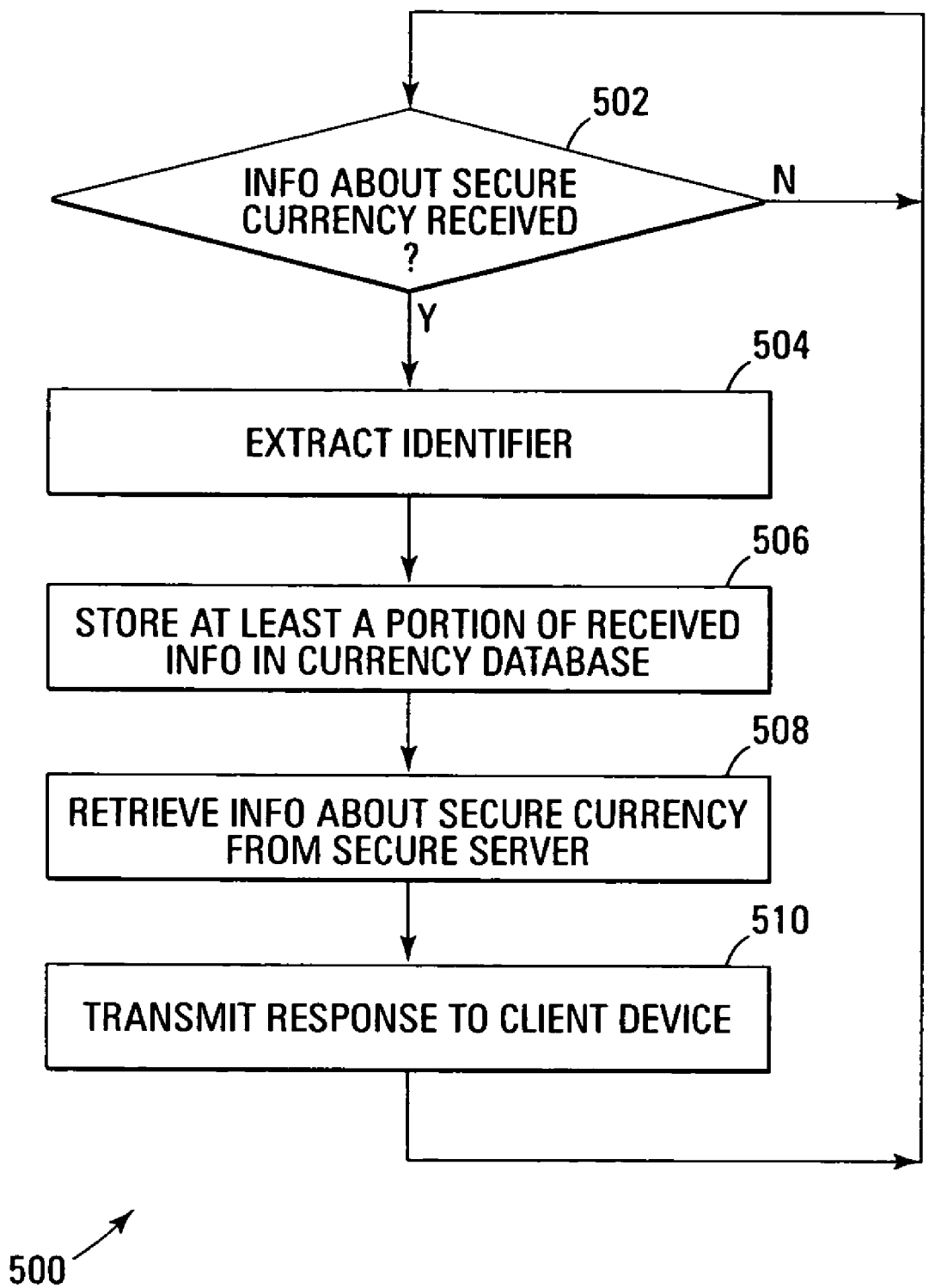
FIG. 5 is a flow diagram of one embodiment of a method of tracking an item of secure currency.

FIG. 5 is a flow diagram of one embodiment of a method 500 of tracking an item of secure currency 100. In the embodiment shown in FIG. 5, the functionality of method 500 is implemented and carried out by a secure server 302 of the secure system 300 shown in FIG. 3. For example, in one exemplary implementation, the functionality of method 500 is implemented in software that is executed by the secure server 302. Moreover, the embodiment of method 500 is used track items of secure currency 100 of the type shown in FIG. 1. The embodiment of method 500 is suitable for use, for example, with client devices 308 that are located where items of secure currency 100 are received (for example, at a retail point of sale or a bank teller where a client device 308 is located). Other embodiments of method 500, however, are implemented using other devices, systems, and secure documents.

When information about an item of secure currency 100 is received at the secure server 302 from a client device 308 (checked in block 502), the secure server 302 extracts an identifier of item of secure currency 100 (block 504). For example, in the embodiment shown in FIG. 5, information about the item of secure currency 100 is read from the item of secure currency 100 and transmitted to the secure server 302 over the network 310 in accordance with method 400 of FIG. 4. The secure server 302, for example, extracts a serial number from the information transmitted to the secure server 302 to use as the identifier of that item of secure currency 100. In such an embodiment, the identifier is used as a key into the currency database 304. The secure server 302 stores at least a portion of the received information in the currency database 304 (block 506). In one example, the received information includes information about a transaction in which the item of secure currency is being used. The transaction information is stored in the currency database 304 for that item of secure currency 100.

Also, in the embodiment of method 500 shown in FIG. 5, the secure server 302 retrieves information about the item of secure currency 100 from the currency database 304 using the identifier (block 508). In one example, the secure server 302 retrieves status information stored in the currency database 304 for that item of secure currency 100 using the identifier as a key. The status information in one example indicates whether the item of secure currency 100 has been activated or deactivated (for example, in accordance with an embodiment of method 700 described below in connection with FIGS. 7A-7B) and/or whether the item of secure currency 100 has been reported stolen. In other embodiments, other types of information are retrieved from the currency database 304.

The secure server 302 transmits a response to the client device 308 derived from at least a portion of the retrieved information (block 510). In the embodiment shown in FIG. 5, the response is transmitted between a server programs executing on secure server 302 to a client program executing on the client device 308 using some type of remote procedure call (RPC) technology. In one example, a web server 322 included in secure server 302 generates and supplies to the client device 308 a web page containing at least a portion of the retrieved information (or information derived from the retrieved information). The web page is transmitted to the client device 308, and a web browser 324 executing on the client device 308 displays the web page on a display device 320 coupled to the client device 308. The server cryptography module 312 and the client cryptography module 314 are used to encrypt, decrypt, and authenticate communications between the secure server 302 and the client devices 308 (for example, using public key encryption technology) in this example.

In one such example, the web page generated by the secure server 302 includes an indication if there is any reason why the item of secure currency 100 should not be accepted or used in that transaction and/or that a particular governmental agency (for example, the police) should be notified in connection with the use of that item of secure currency 100. For example, it may be the case that the currency database 304 at the secure server 302 indicates that the item of secure currency 100 used in the transaction has been stolen. In such a case, the web page sent from the server 302 by the client device 308 includes information indicating that the item of secure currency 100 has been stolen and should not be accepted and that the police (or the party that reported the particular of item of secure currency 100 as stolen) should be contacted in connection with this transaction. In one embodiment, the secure server 302 automatically notifies the government agency (for example, by sending an email or other communication to the government agency).

Figure 6:
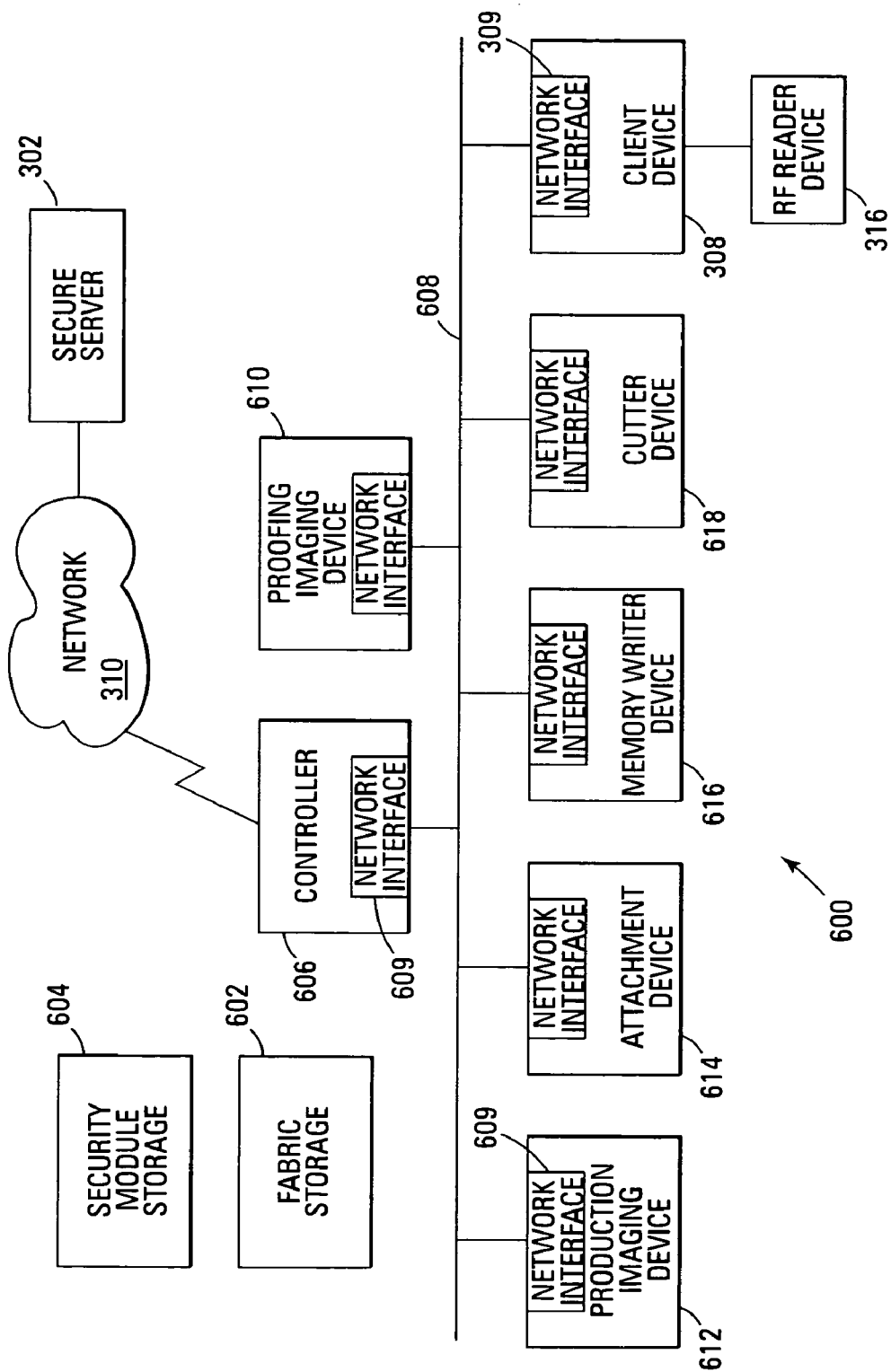
FIG. 6 is a block diagram of one embodiment of a system for manufacturing secure documents.

FIG. 6 is a block diagram of one embodiment of a system 600 for manufacturing secure documents. In the embodiment of system 600 shown in FIG. 6, items of secure currency 100 of the type shown in FIG. 1 are manufactured. Pliable fabric and the security modules 112 from which the items of secure currency 100 are manufactured are stored in secure storage areas 602 and 604. In the embodiment shown in FIG. 6, the fabric and the security modules 112 are stored in separate secure storage areas 602 and 604. Storing the fabric and security modules 112 separately can improve the security of the currency manufacturing process by making it more difficult to steal the components from which the items of secure currency 100 are fabricated.

System 600 includes controller 606 that controls the manufacturing process. Controller 606 is implemented using one or more computers that execute software that carries out the functionality described here as being performed by the controller 606. Although controller 606 is shown in FIG. 6 as a single entity, those skilled in the art will recognize that in other embodiments the controller 606 is implemented in a distributed manner in which the functionality of the controller 606 is performed by multiple controllers. The controller 606 communicates with the other components of the system 600 over a network 608. In the embodiment shown in FIG. 6, the network 608 is implemented as a local area network (for example, an ETHERNET local area network). Each of the devices shown in FIG. 6 includes a network interface 609 that couples that device to the network 608.

The system 600 includes a proofing imaging device 610. Artwork 104 that is to be included on the items of secure currency 100 is generated. The proofing imaging device 600 generates a proof that based on the generated artwork. As noted above, the artwork 104 typically includes several security features such as an enlarged off-center portrait, a watermark, fine-line printing patterns, color-shifting ink, and microprinting that appears as a thin line to the naked eye but actually includes lettering that can be read using a low-power magnifier. Also, the printer technology used to print the artwork 104 provides several security features, for example, by using specially designed printers with magnetic ink. In one embodiment, the proofing imaging device 610 uses a six-color ink and automatic closed-loop color calibration printing technology to print the artwork 104 onto proofing media. One example of a suitable proofing imaging device 610 is a printer that is capable of printing on large-format media (also referred to as a "large-format" printer).

Proofs of the artwork 104 are generated by the proofing imaging device 610. The proofs are compared with a reference artwork image in order to determine if the configuration of the proofing imaging device 610 is suitable for printing the artwork 104 in a manner that matches the reference artwork image. When suitable proofs are printed, the configuration of the proofing image device 610 is captured by the controller 606 and used to configure a production imaging device 612 that will be used to print the actual items of secure currency 100. In one embodiment, the production imaging device 612 uses liquid electro-photography (LEP) technology to print the artwork 104 onto actual items of secure currency 100. One example of a suitable production imaging device 612 is a digital printing press that uses such LEP technology.

The system 600 includes an attachment device 614 that attaches the security modules 112 to the fabric of each item of secure currency. In one embodiment, the security modules 112 are attached to the fabric as described below in connection with FIG. 9. In one embodiment, the attachment device 614 is implemented using a pick-and-place robot. The system 600 also includes a memory writer device 616. The memory writer device 616 is used to write information to the memory 114 of the security module 112 included in each item of secure currency 100. For example, in one embodiment, the memory writer device 616 writes the serial number 108 and the denomination 106 of each item of secure currency 100 to that item's memory 114. For example, where memory 114 includes PROM, the memory writer device 616 includes PROM writer that is capable of writing data to that type of PROM. The system 600 also includes a cutter 618 that cuts the sheets of fabric into individual items of secure currency 100. In the embodiment shown in FIG. 6, the storage areas 602 and 604, the controller 606, LAN 608, imaging devices 610 and 612, attachment device 614, memory writer 616 and cutter 618 are housed at a single, centralized location (for example, a secure government facility such as a mint).

In the embodiment shown in FIG. 6, the controller 606 controls and coordinates the operation of the proofing imaging device 610, the attachment device 614, the production imaging device 612, the memory writer device 616, and the cutter 618. In addition, the controller 606 tracks and manages the inventory of fabric and security modules 112. In the embodiment shown in FIG. 6, the controller 606 communicates with the secure server 302 of FIG. 3 over the network 310. The communications between the controller 606 and the secure server 302 are encrypted in this embodiment. For example, the secure sever 302 supplies to the controller 606 information used to manufacture items of secure currency 100 such as, for example, serial number or denomination information or artwork. Moreover, the controller 606 communicates with the secure server 302 to provide the secure server 302 with the status of each item of secure currency 100 that is being manufactured.

Figure 7A:
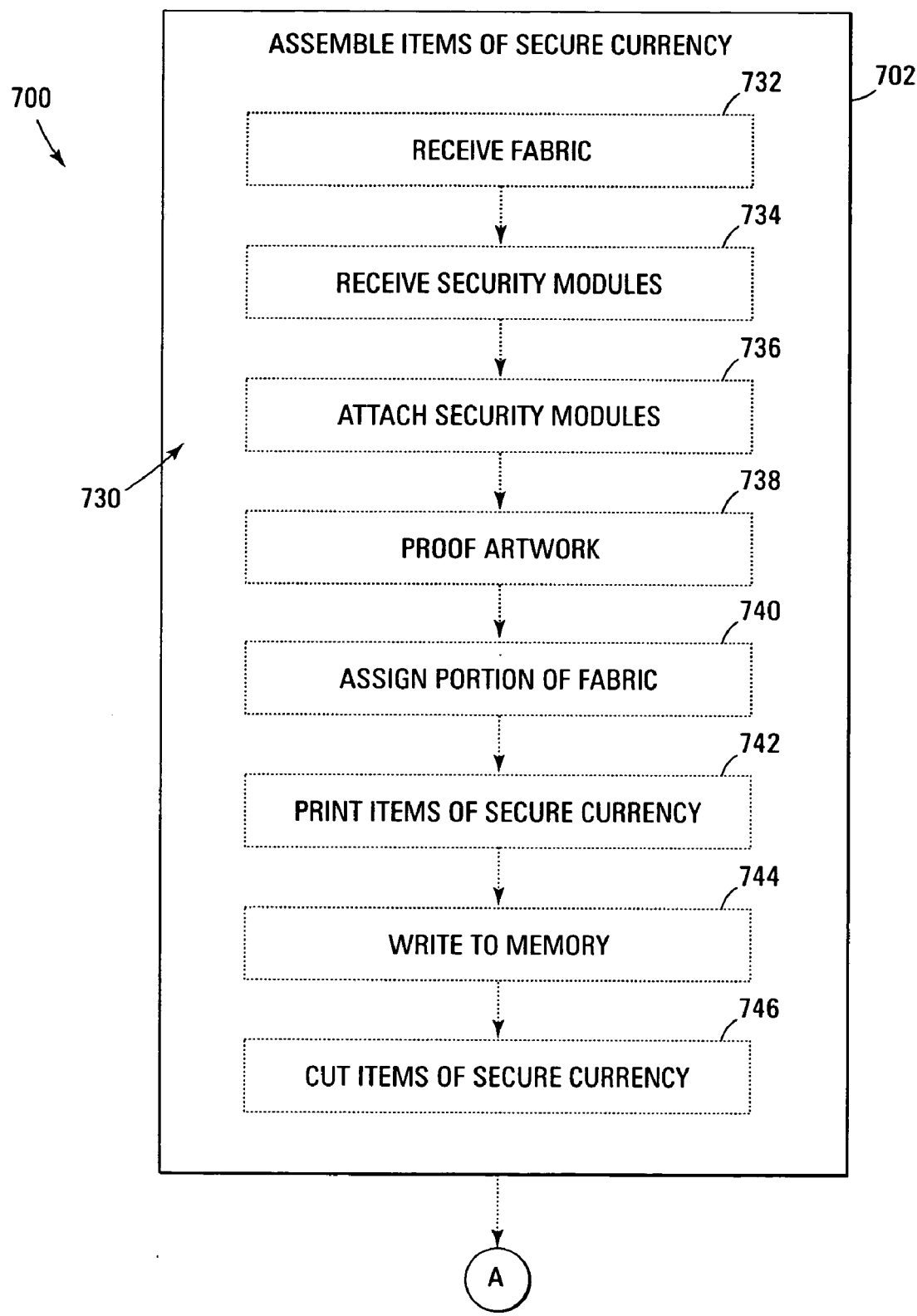
FIGS. 7A-7B are a flow diagram of one embodiment of a method of manufacturing items of secure currency.
Figure 7B:
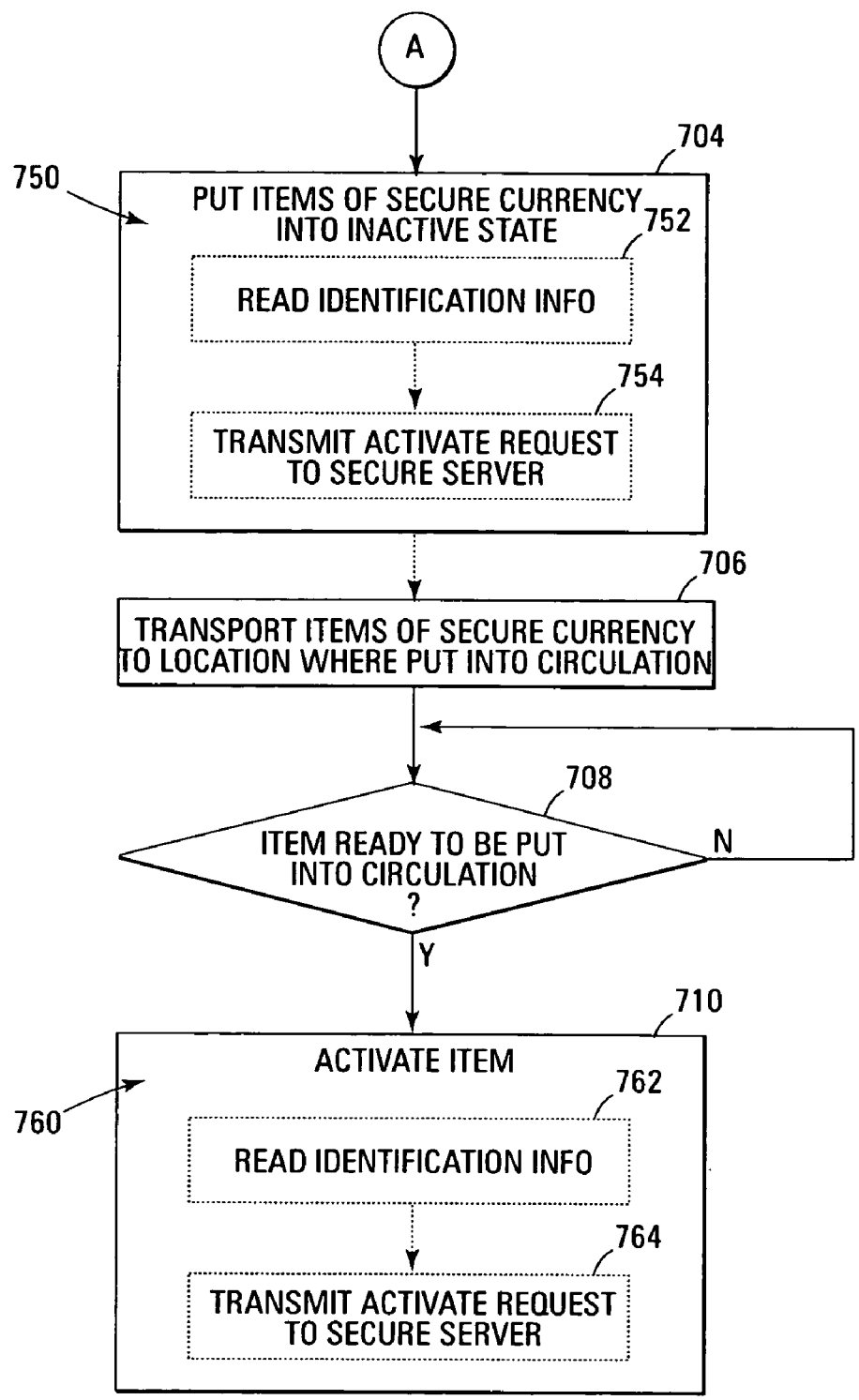

FIGS. 7A-7B are a flow diagram of one embodiment of a method 700 of manufacturing items of secure currency 100. Method 700 includes assembling items of secure currency 100 (block 702). One implementation of a process 730 of assembling items of secure currency 100 is shown in FIG. 7A using dashed lines. The process 730 shown in FIG. 7A is implemented using the system 600 shown in FIG. 6. Process 730 includes receiving sheets of pliable fabric from which items of secure currency 100 are constructed (block 732 shown in FIG. 7A) and receiving the security modules 112 from which items of secure currency are constructed (block 734). For example, the sheets and security modules 112 are stored in secure storage areas 602 and 604, respectively.

Method 700 includes attaching a security module 112 to the pliable fabric for each item of secure currency 100 that is to be created from the fabric (block 736). In one embodiment, each sheet is divided into a grid that includes multiple rectangular portions, each portion having the dimension of the pliable fabric 102 of an item of secure currency 100. Each security module 112, in such an embodiment, is attached to one of the rectangular portions by the attachment device 614. One approach to attaching a security module 112 to fabric is described below in connection with FIG. 9.

Method 700 also includes proofing the artwork 104 that is to be printed on the items of secure currency 100 (block 738). The reception of the sheets of fabric, the reception of the security modules 112, the attachment of the security modules 112, and the proofing of the artwork 104 (and the subsequent printing), in one embodiment, need not occur in any predetermined order and need not occur at the same location. Typically, however, the proofing of the artwork 104 will occur just before the printing described below in connection with block 742.

Method 700 includes assigning a portion of each sheet of fabric to each item of secure currency 100 that is to be manufactured (block 740). For example, in one embodiment, each sheet is divided into a grid that includes multiple rectangular portions, each portion having the dimensions of a pliable fabric 102 for an item of secure currency 100. The controller 606 assigns a rectangular portion of a sheet of fabric to each item of secure currency 100 that is to be manufactured. The controller 606 tracks which item of secure currency 100 is assigned to which rectangular portion of which sheet.

Method 700 includes printing the artwork 104 for each item of secure currency 100 on the portion of the fabric assigned to that item of secure currency 100 (block 742). During this printing operation, the controller 606, for each item of secure currency 100, generates the item-specific portions of the artwork 104 (for example, the human-readable serial number 106 and the bar code 110 assigned to that item of secure currency 100) to the artwork 104. Resulting artwork 104 for each item of secure currency 100 is supplied to the production imaging device 612 for printing. The production imaging device 612, under the control of the controller 606, prints the artwork 104 for each item of secure currency 100 on the portion of the sheet assigned to that item of secure currency 100.

Method 700 includes writing identification information to the memory 114 of each item of secure currency 100 (block 744). For example, in one embodiment, the memory writer 616 writes the serial number 116, the denomination 118 and the authentication information 117 to the memory 114 of each item of secure currency 100. The memory writer 616 writes to memory 114 of each item of secure currency 100 under the control of the controller 606. To reduce the likelihood that the serial number 106 printed on an item of secure currency 100 does not match the serial number 116 that is written to the memory 114 of that item of secure currency 100, in one embodiment, the production imaging device 612 and the memory writer 616 are configured and located so that the printing of each item of secure currency 100 occurs at the same time as the writing of the identification information to the memory 114.

Method 700 also includes cutting the sheet of fabric into separate items of secure currency 100 (block 746). The cutter 618 performs this cutting under the control of the controller 606. After cutting, each item of secure currency 100 is in that item's final physical form.

Each assembled item of secure currency 100 is put into an inactive state (block 704 shown in FIG. 7B). When an item of secure currency 100 is in the inactive state, that item has not been activated and cannot be used as legal tender. One implementation of a process 750 of putting an item of secure currency 100 in an inactive state is shown in FIG. 7B using dashed lines. In that implementation, a client device 308 reads identification information from the item of secure currency 100 (block 752). In one example, the serial number 116 stored in the memory 114 of that item is read by the client device 308 (for example, using a RF reader device 316). The client device 308 transmits to the secure server 302 a request to put the item of secure currency 100 in the inactive state (block 754). The request includes the identification information read from the item of secure currency 100 and, in this example, a digital signature generated by the client cryptography module 314 of the client device 308. The secure server 302 receives the request. The server cryptography module 312 verifies that the digital signature is authentic. If the digital signature is authentic, the secure server 302 adds an entry to the currency database 304 for the item of secure currency 100. The secure server 302 updates the entry in the currency database 304 for that item of secure currency 100 to indicate that the item is in the inactive state.

Until the status of that item of secure currency 100 changes (that is, until that item of secure currency 100 is activated), the secure server 302 responds to subsequent queries about that item of secure currency 100 with a response that indicates that the item of secure currency 100 is in the inactive state. Therefore, in the event that an item of secure currency 100 in the inactive state is tendered for payment (for example, where the item of secure currency 100 is stolen before it is put in circulation), if the status of that item is checked prior to accepting the item by transmitting the serial number or other identifier to a secure server 302, the secure server 302 will respond with an indication that the item of secure currency 100 is inactive and is not legal tender. In addition, an appropriate government agency can be notified of the facts surrounding the tender of that item of secure currency 100.

In one embodiment, the items of secure currency 100 remains in the inactive state while the items are stored and later transported to the various institutions that put the items of secure currency 100 into circulation (block 706). In such an embodiment, each item of secure currency 100 is kept in the inactive state until that item is actually put into circulation. When an item of secure currency 100 is ready to be put into circulation (checked in block 708), the item of secure currency 100 is activated (block 710). One implementation of an activation process 760 is shown in FIG. 7B using dashed lines. In that implementation, a client device 308 reads identification information from the item of secure currency 100 (block 762). In one example, the client device 308 is located at the point at which the item of secure currency 100 is placed into circulation (for example, at a bank). In such an example, the serial number 116 stored in memory 114 of an item is read by the client device 308 (for example, using a RF reader device 316). The client device 308 transmits to a secure server 302 a request to activate the item of secure currency (block 764). The request includes the identification information read from the item of secure currency 100 and, in this example, a digital signature generated by the client cryptography module 314. The secure server 302 receives the request. The server cryptography module 312 verifies that the digital signature is authentic. If the digital signature is authentic, the secure server 302 updates the currency database 304 to indicate that the item of secure currency 100 associated with that identifier information has been activated. Until the status of that item of secure currency 100 changes (for example, as described below in connection with FIG. 8), the secure server 302 responds to subsequent queries about that item of secure currency 100 with a response that indicates that the item of secure currency 100 has been activated.

Figure 8:
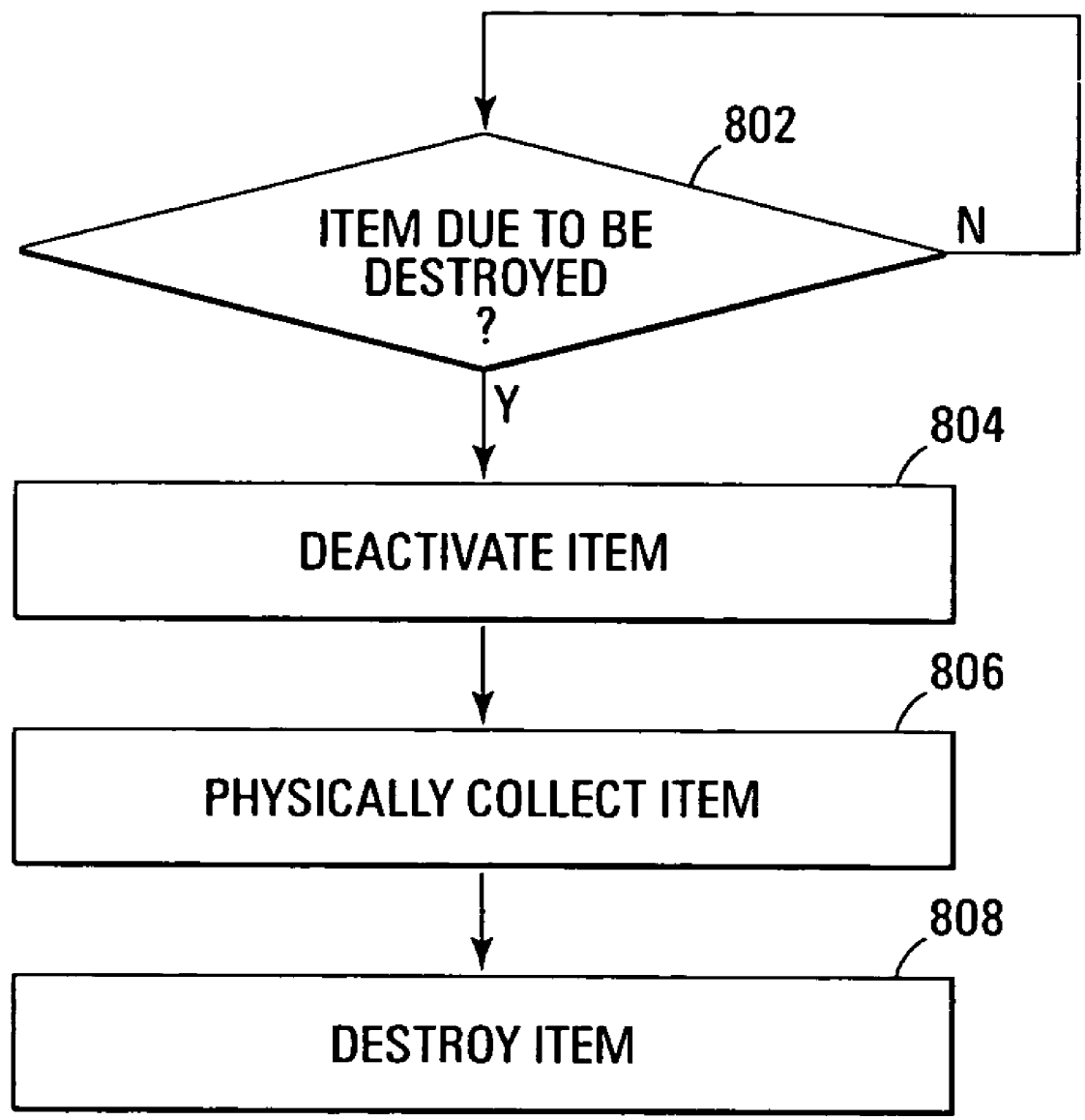
FIG. 8 is a flow diagram of one embodiment of a method for controlled destruction of secure documents.

FIG. 8 is a flow diagram of one embodiment of a method 800 for controlled destruction of secure documents. The embodiment of method 800 shown in FIG. 8 is used for the controlled destruction of items of secure currency 100 of the type shown in FIG. 1. However, other embodiments of method 800 are used for the controlled destruction of other types of secure documents. When an item of secure currency 100 is due to be destroyed (checked in block 802), the item of secure currency 100 is deactivated (block 804). Then, the deactivated item of secure currency 100 is physically collected (block 806). In one embodiment, the item of secure currency 100 is deactivated, after appropriate authentication, by updating the information stored in the currency database 100 for that item of secure currency 100 to indicate that the item has been deactivated. The collected deactivated item of secure currency 100 is then physically destroyed or recycled (block 808). The destruction process, in one embodiment, involves separating the security module 112 for the item of secure currency 100 from the pliable fabric 102. Then the security module 112 and/or the pliable fabric 102 can be recycled for use in, for example, other items of secure currency 100.

In one exemplary implementation of the embodiment of method 800 shown in FIG. 8, when a client device 308 reads an item of secure currency 100, the client device 308 communicates to the secure server 302 the status of the integrity meter 120 for that item. If the status indicates that the connection between the security module 112 and the pliable fabric 102 has been comprised, the secure server 302 updates the information stored in the currency database 304 for that item to indicate that the item is due to be destroyed. When that item of secure currency 100 is later received by an institution that collects items of secure currency 100 for destruction (for example, by a bank or other financial institution) and the institution queries the secure server 302 about that item of secure currency 100, the secure server 302 will respond that the item is due to be destroyed. The institution then sets aside that item for subsequent destruction. Then, the institution exchanges with the government the set-aside to-be-destroyed items of secure currency 100 for new items of secure currency 100. The set-aside to-be-destroyed items of secure currency 100 are deactivated and new items are activated when as a part of the exchange (for example, by informing the secure server 302 of the exchange and that the status of the exchanged items should be updated). The government then destroys and/or recycles the deactivated items of secure currency 100.

Figure 9:
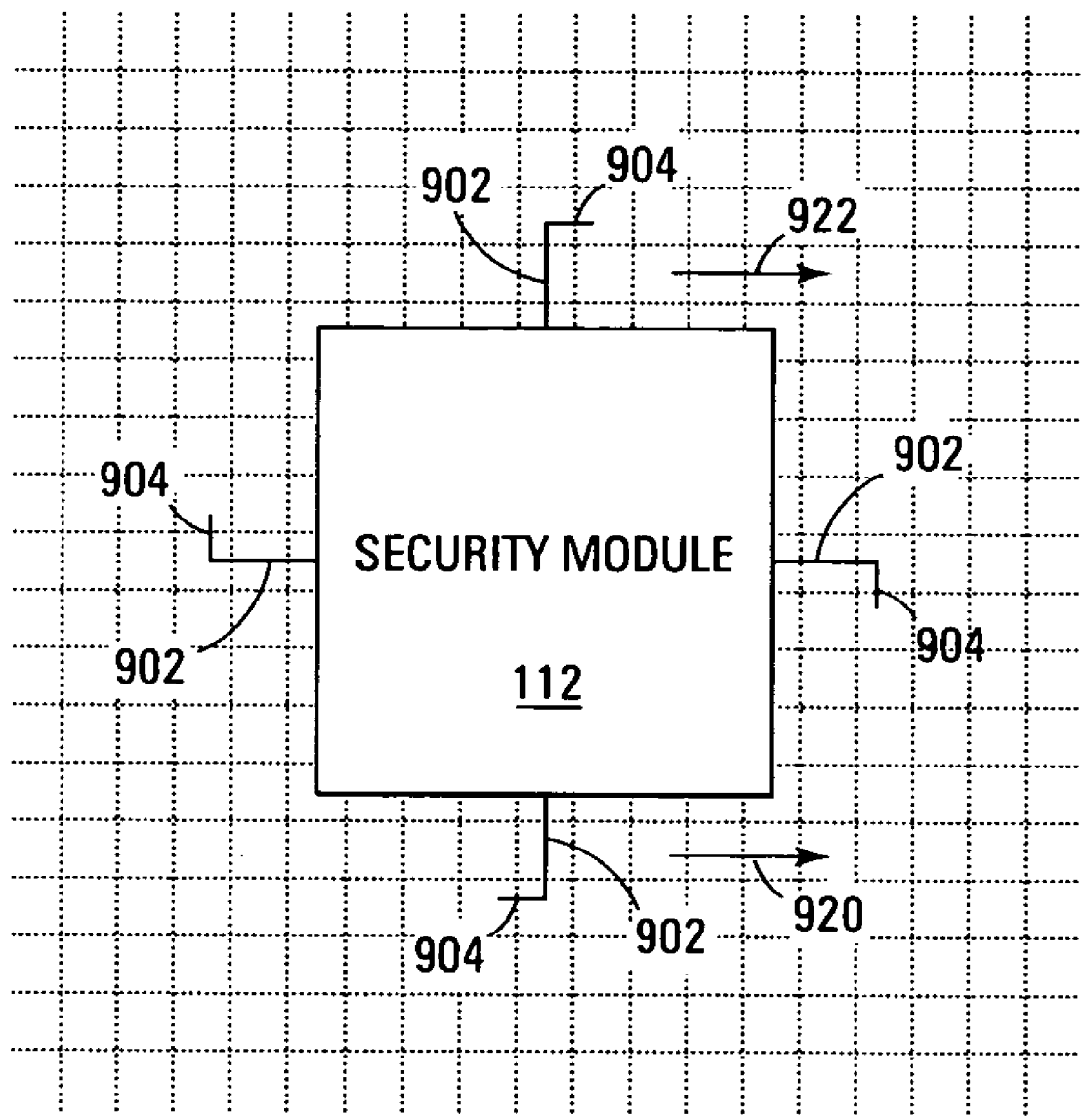
FIG. 9 is a block diagram of one embodiment of a mechanism to attach a security module to the pliable fabric of an item of secure document.

FIG. 9 is a block diagram of one embodiment of a mechanism to attach a security module 112 to the pliable fabric of a secure document. In the embodiment shown in FIG. 9, the secure document is an item of secure currency 100. Although the embodiment shown in FIG. 9 is used with a security module 112 of an item of secure currency 100 of the type shown in FIG. 1, it is to be understood that other types of attachment mechanisms, security modules, pliable fabrics, and/or secure documents are used in other embodiments. The security module 112 shown in FIG. 9 includes a four fabric hooks 902. In one implementation, each of the fabric hooks 902 is formed as a part of single loop of conductive wire as shown in FIG. 10 and forms a part of the integrity meter 120 shown in FIG. 10.

During manufacture of the item of secure currency 100, the fabric hooks 902 are embedded in the pliable fabric for that item of secure currency 100. For example, in one approach, the hooks are threaded or inserted into the fabric. Such an approach provides a secure connection between the security module 112 and the fabric that still allows the security module 112 to move a small amount relative to the fabric.

In the embodiment shown in FIG. 9, the distal portion 904 of each hook 902 is directed along a different axis. This arrangement helps secure the security module 112 to the pliable fabric 102. For example, if the secure module 112 is pulled in a direction that tends to pull a first distal portion 904 of a first hook 902 out of the fabric (as illustrated with arrow 920), the pulling will cause a second distal portion 904 of a second hook 902 located directly across from the first hook 902 to be further embedded in the fabric (as illustrated with arrow 922).

Figure 10:
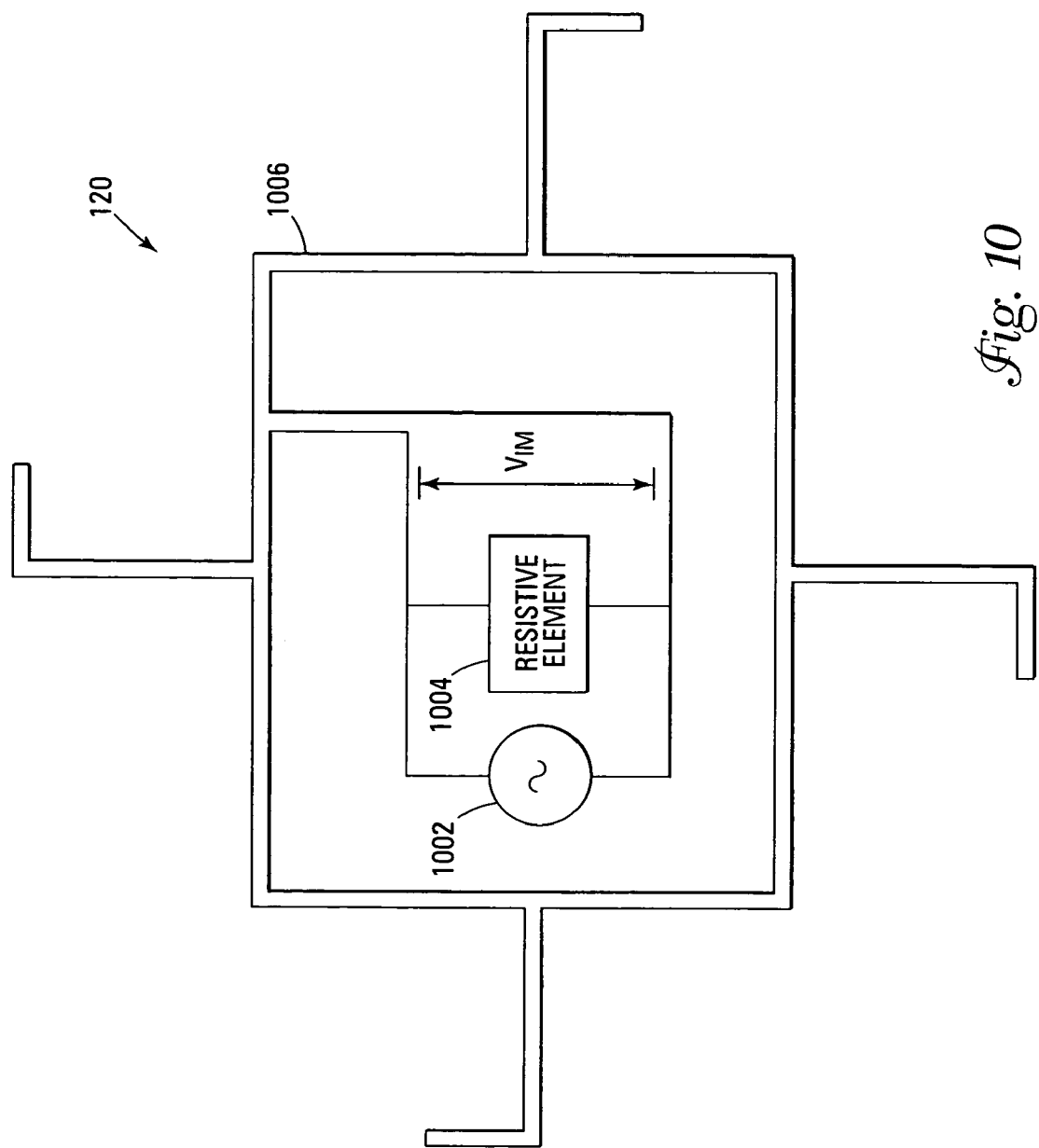
FIG. 10 is a block diagram of one embodiment of an integrity meter.

FIG. 10 is a block diagram of one embodiment of an integrity meter 120. Although the embodiment shown in FIG. 10 is used with a security module 112 of an item of secure currency 100 of the type shown in FIG. 1, it is to be understood that other types of integrity meters, security modules, pliable fabrics, and/or secure documents are used in other embodiments. The integrity meter 120 includes a current source 1002 that is in parallel with a resistive element 1004. In one embodiment, the current source 1002 is the power extraction circuit 126, which supplies a power output signal when the item of secure currency 100 is being read by a RF reader (for example, RF reader device 316 of FIG. 3). The resistive element 1004, in one implementation, is a resistor having a high resistance (for example, 10 kilohms). Also, a loop 1006 is in parallel with the current source 1002 and the resistor 1006. The hooks (for example, the hooks 902 of FIG. 9) that affix the security module 112 to the fabric of an item of secure currency 100 are formed from the loop 1006.

When the current source 1002 supplies a current in the circuit 1000, if the loop 1006 is unbroken, the current will flow through the loop 1006 and the voltage $V_{IM}$ across the resistive element 1004 will be zero (0). If, however, there if the loop 1006 is physically broken such that current is unable to flow through the loop, a voltage will develop across the resistive element (that is $V_{IM}>0$). The build-up of this voltage $V_{IM}$ indicates that there is break in the loop 1006. For example, if one of the loops formed from the loop 1006 breaks (for example, due to wear or tampering), the voltage $V_{IM}$ will develop when the current source 1002 supplies a current in the circuit. In one implementation, when the item of secure currency 100 is read by a RF reader device 316, a determination is made by the decoder 132 as to whether a voltage $V_{IM}$ has developed. If such a voltage $V_{IM}$ has developed, the decoder 132 indicates that the integrity of the connection of the security module 112 to the fabric has been comprised to the reader device 316.

Figure 11:
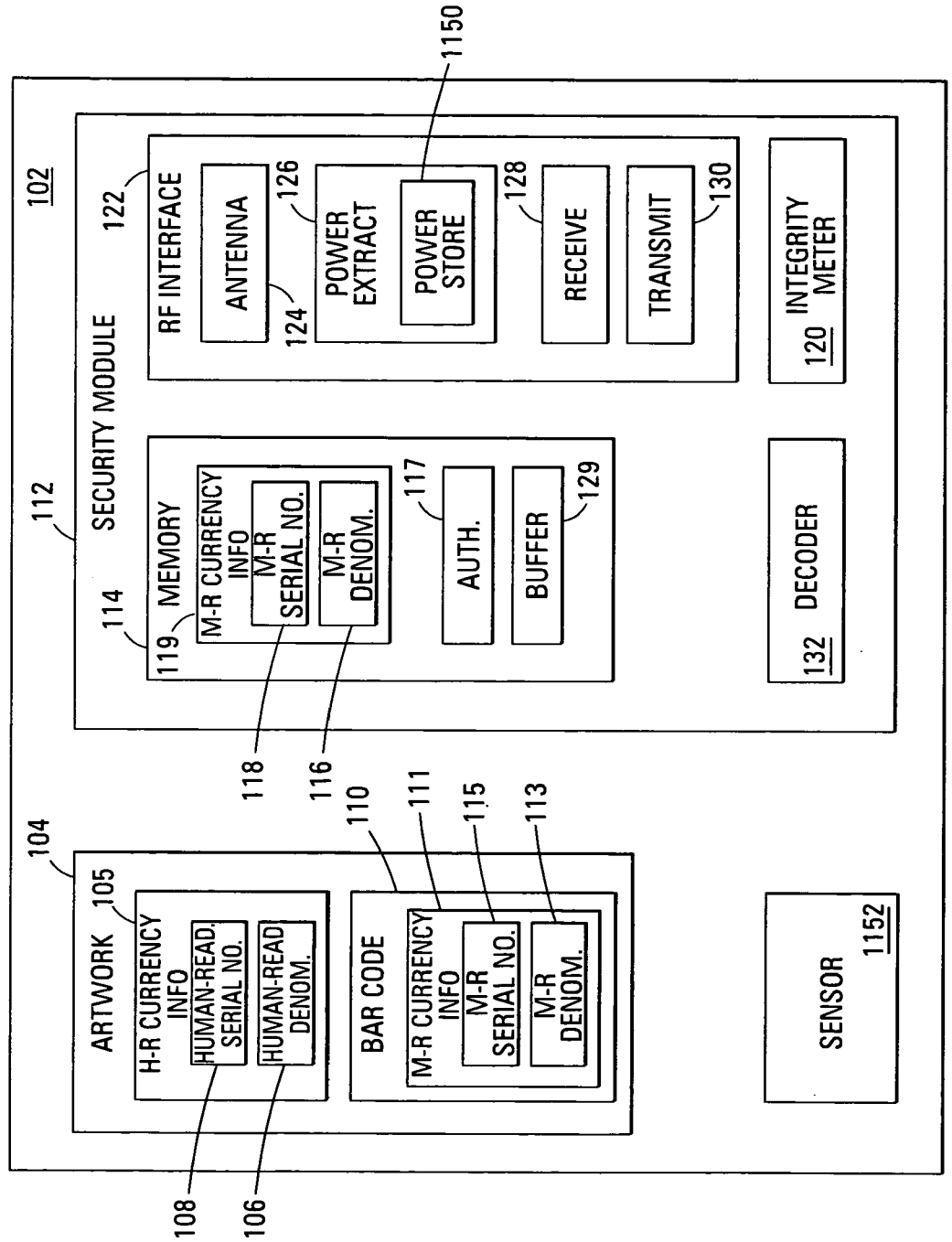
FIG. 11 is a block diagram of another embodiment of a secure document.

FIG. 11 is a block diagram of another embodiment of a secure document 1100. The particular embodiment of a secure document 1100 shown in FIG. 11 is an item of secure currency 1100. The item of secure currency 100 shown in FIG. 11 includes all the components of the item of secure currency 100 shown in FIG. 1. Such like components are numbered using the same reference numerals as in FIG. 1. The item of secure currency 1100 shown in FIG. 11 includes a power storage unit 1150 such as a capacitor. The power storage unit 1150 is trickled charged by the power signal output by the power extraction circuit 126. The item of secure currency 100 also includes a sensor 1152. Sensor 1152 is small sensor that is capable of detecting a chemical signature associated with a particular substance. For example, in one implementation, the sensor 1152 is capable of detecting a chemical signature associated with an illegal drug such as cocaine.

When sufficient power is stored in the power storage unit 1150, the sensor 1152 is activated. If, while activated, the sensor 1152 detects the chemical signature associated with the particular substance, the decoder 132 sets a flag stored in memory 114 that indicates that the sensor 1152 has detected the chemical signature. Next time the item of secure currency 100 is read by an RF reader device 316, the fact that the flag is set is included in the information that is sent to the reading device. For example, in one implementation, the secure server 302 is notified of the fact that the sensor 1152 has detected the chemical signature. The secure server 302 updates the information stored in the currency database 304 for that item to indicate that the sensor 1152 has detected the chemical signature. In one such implementation, the flag in memory 114 is cleared after the item of secure currency 100 is read by a RF reader device 316. The information from the sensor 1152 that is stored in the currency database 304, in one embodiment, is used by law enforcement agencies to identify suspects and/or locations for further investigation.

Figure 12:
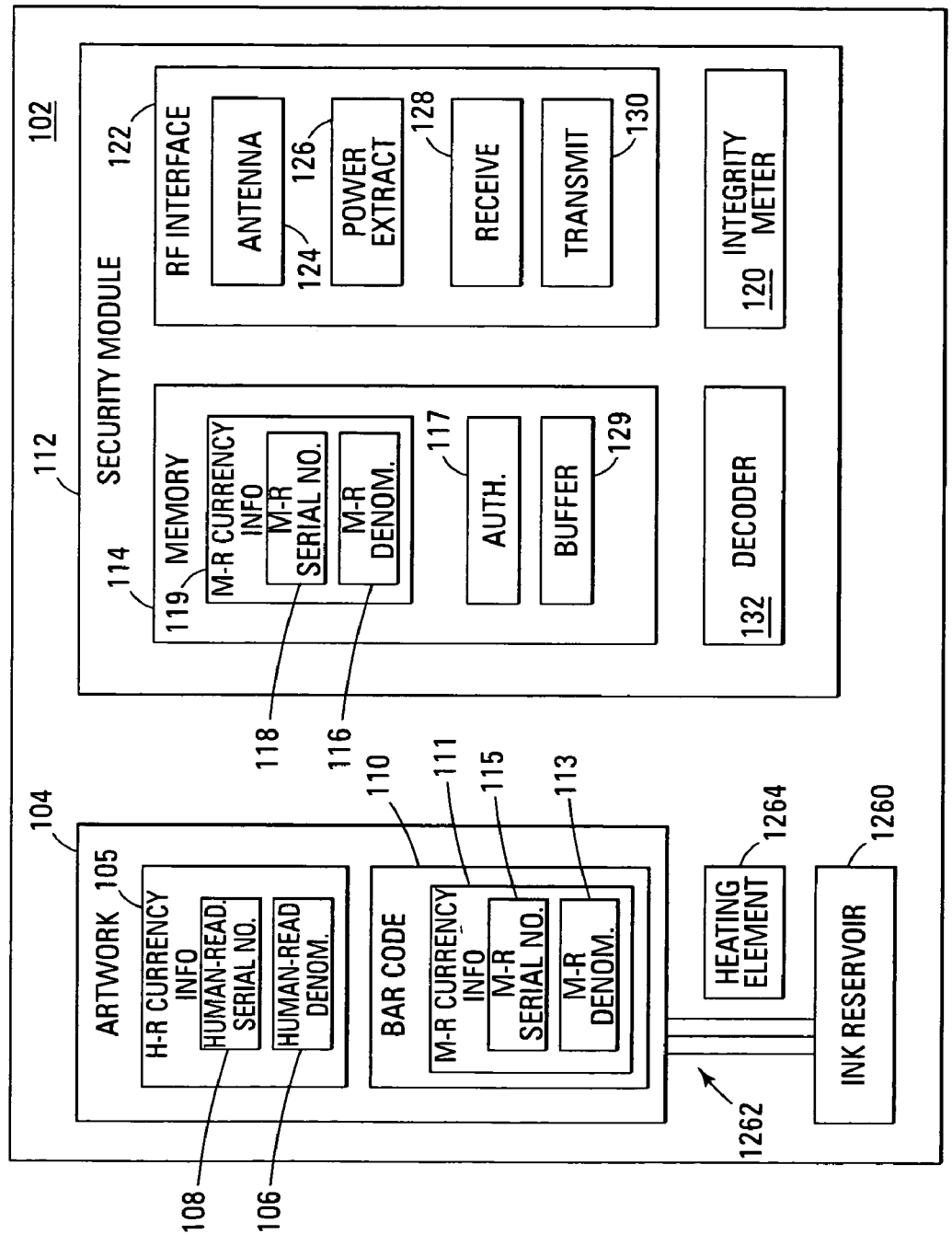
FIG. 12 is a block diagram of another embodiment of a secure document.

FIG. 12 is a block diagram of another embodiment of a secure document 1200. The particular embodiment of a secure document 1200 shown in FIG. 12 is an item of secure currency 1200. The item of secure currency 1200 shown in FIG. 12 includes all the components of the item of secure currency 100 shown in FIG. 1. Such like components are numbered using the same reference numerals as in FIG. 1. The item of secure currency 1200 shown in FIG. 12 includes an ink reservoir 1260. The ink reservoir 1260 stores permanent ink. Ducts 1262 connect the ink reservoir 1260 to the pliable fabric 102 of the item of secure currency 100. A heating element 1264 is thermally coupled to the ducts 1262. The heating element 1264 is used to heat up the ducts 1262. When the ducts 1262 are heated, the ducts 1262 expand to a width sufficient to let ink stored in the ink reservoir 1260 pass through the ducts 1262. The ink that passes through the ducts 1262 bleeds into the pliable fabric 102. In one implementation, the ducts 1262 are located so that the bleeding inks will obscure the human-readable serial number 106 and the bar code 110 included in the artwork 110.

In one implementation, the heating element 1264 heats the ducts 1262 in response to a command that is received from an RF reader device 316. For example, when an item 1200 is deactivated (for example, as described above in connection with FIG. 8), a RF reader device 316 sends the command to the item of secure currency 1200. The antenna 124 of the item receives the command and the receive circuit 128 of the RF interface 122 extracts the command from the received signal. The decoder 312, in response to the extracted command, causes the heating element 1264 to heat the ducts 1262 in order to release the ink stored in the ink reservoir 1260. This causes the ink to bleed into the pliable fabric 102, thereby staining the pliable fabric 102. The stain signals that the item of secure currency 1200 has been deactivated and is no longer legal tender. In this way, the fact that an item of secure currency 1200 has been deactivated can be determined visually without requiring special equipment (for example, an RF reader device 316). Thus, even if the deactivated item of secure currency 1200 should happen to be stolen, the ink stain will mark the currency as deactivated and venders and the public at large can be educated to not accept such items of secure currency 1200.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A secure document, comprising:
   a pliable fabric comprising human-readable information;
   a memory attached to the pliable fabric in which machine-readable information about the secure document is stored; and
   an interface attached to the pliable fabric and coupled to the memory that, when a reader device reads the secure document, transmits at least a portion of the machine-readable information stored in the memory to the reader device, wherein the machine-readable information includes data of plural transactions in which the secure document was previously used; wherein the secure document is a secure item of currency.

2. The secure document of claim 1, wherein the pliable fabric comprises artwork that includes the human-readable information.

3. The secure document of claim 2, wherein the artwork comprises a bar code.

4. The secure document of claim 3, wherein the bar coda comprises a watermark.

5. The scare document of claim 3, wherein the bar code is printed using magnetic ink.

6. The secure document of claim 1, wherein the pliable fabric comprises at least one of cloth, paper, and laminate.

7. The secure document of claim 1, further comprising a sensor, wherein when the secure item of currency is read by the reader device, information generated by the sensor is supplied to the reader device.

8. The secure document of claim 7, wherein the sensor detects a chemical signature.

9. A item of currency, comprising:
   a pliable fabric comprising human-readable currency information; and
   a security module comprising:
      a memory attached to the pliable fabric in which machine-readable currency information and authentication information are stored; and
      a radio frequency interface attached to the pliable fabric and coupled to the memory; and
      wherein the authentication information indicates whether a radio frequency reader device is authorize to communicate with the currency so data can be read from and written to the memory; wherein the machine-readable information includes data of plural transaction in which the item of currency was previously used.

10. The item of currency of claim 9, wherein the human-readable currency information comprises at least one of a human-readable identifier and a human-readable denomination.

11. The item of currency of claim 9, wherein the machine-readable currency information comprises at least one of a machine-readable identifier and a machine-readable denomination.

12. The item of currency of claim 9, wherein the radio frequency interface comprises a power extraction circuit that extracts power from the radio frequency field, wherein the extracted power powers the security module.

13. The item of currency of claim 9, wherein the radio frequency interface comprises a transmit circuit that transmits the at least a portion of the machine-readable currency information to the radio frequency reader device when the radio frequency interface receives the radio frequency field radiated by the radio frequency reader device.

14. The item of currency of claim 9, wherein the radio frequency interface comprises a receive circuit that extracts information encoded in the radio frequency field radiated by the radio frequency reader device.

15. The item of currency of claim 9, wherein the memory stores information indicating whether the item of currency previously communicated with a radio.

16. The item of currency of claim 9, further comprising an integrity meter that determines the integrity of a connection between the security module and the pliable fabric.

17. The item of currency of claim 16, wherein the integrity meter is coupled to a current source and comprises a resistive element in parallel with the current source and a conductive loop in parallel with the current source, wherein the conductive loop comprises a plurality of hooks that attach the security module a to the pliable fabric.

18. A item of currency, comprising:
   a fabric; and
   a security module attached to the fabric, wherein the security module comprises a memory in which information about the item of currency is stored and an ink reservoir in which ink is stored; and
   wherein when the security module receives a predetermined command, the security module releases the ink stored in the ink reservoir in order to mark the fabric.

19. The item of currency of claim 18, wherein the security module further comprises a duct coupled to the ink reservoir and the fabric.

20. The item of currency of claim 19, wherein the security module further comprises a heating element and wherein the security module releases the ink by causing the heating element to heat the duct when the item of currency receives the predetermined command.

21. A item of currency, comprising:
   a pliable fabric having human-readable currency information;
   a memory;
   an interface for communicating with a reader device; and
   a security module that authenticates the reader device in order to authorize data to be written to and read from the memory; wherein the memory comprises machine-readable information including data of plural transaction in which the item of currency was previously used.

22. The item of currency of claim 21, wherein the security module allows the reader device access to the memory if authentication of the reader device is successful and denies access to the memory if authentication of the reader device is not successful.

23. The item of currency of claim 21, wherein the security module authenticates the reader device before write operations to the memory are performed.

24. The item of currency of claim 21, wherein the security module detects whether the item of currency is compromised due to tampering or wear.

25. The item of currency of claim 21, wherein the memory stores information regarding whether the memory was previously accessed from a reader device.

26. The item of currency of claim 21, wherein the memory stores information regarding whether the item of currency was previously tampered with.

27. The item of currency of claim 21 further comprising a sensor, and wherein the memory stores information generated by the sensor.

28. The item of currency of claim 21, wherein the memory stores data of plural transactions in which the item of currency was previously used.

29. The item of currency of claim 21, wherein the memory stores authentication data indicating whether the reader device is authorized to communicate with the currency.

30. The item of currency of claim 21, further comprising a decoder implemented as a finite state machine.

* * * * *

UNITED STATES PATENT AND TRADEMARK OFFICE
CERTIFICATE OF CORRECTION

| | | |
|---|---|---|
| PATENT NO. | : 7,246,754 B2 | Page 1 of 1 |
| APPLICATION NO. | : 10/781197 | |
| DATED | : July 24, 2007 | |
| INVENTOR(S) | : Ray Siuta et al. | |

It is certified that error appears in the above-identified patent and that said Letters Patent is hereby corrected as shown below:

In column 5, line 55, delete "1112" and insert -- 112 --, therefor.

In column 22, line 10, in Claim 4, delete "coda" and insert -- code --, therefor.

In column 22, line 12, in Claim 5, delete "scare" and insert -- secure --, therefor.

In column 22, line 32, in Claim 9, delete "authorize" and insert -- authorized --, therefor.

In column 22, line 62, in Claim 15, delete "radio." and insert -- radio frequency reader device. --, therefor.

In column 23, line 4, in Claim 17, after "module" delete "a".

Signed and Sealed this

Seventh Day of October, 2008

JON W. DUDAS
*Director of the United States Patent and Trademark Office*